(12) United States Patent
Monrad

(10) Patent No.: US 11,376,639 B2
(45) Date of Patent: Jul. 5, 2022

(54) APPARATUS FOR CLEANING OBJECT SURFACE

(71) Applicant: Romoline AS, Oppdal (NO)

(72) Inventor: Rolf Monrad, Oppdal (NO)

(73) Assignee: ROMOLINE AS, Oppdal (NO)

( * ) Notice: Subject to any disclaimer, the term of this patent is extended or adjusted under 35 U.S.C. 154(b) by 279 days.

(21) Appl. No.: 16/621,015

(22) PCT Filed: Jun. 15, 2018

(86) PCT No.: PCT/NO2018/050163
§ 371 (c)(1),
(2) Date: Dec. 10, 2019

(87) PCT Pub. No.: WO2018/231070
PCT Pub. Date: Dec. 20, 2018

(65) Prior Publication Data
US 2020/0188965 A1    Jun. 18, 2020

(30) Foreign Application Priority Data

Jun. 15, 2017  (NO) .................................. 20170980

(51) Int. Cl.
*B60S 1/44*  (2006.01)
*B60S 1/52*  (2006.01)
(Continued)

(52) U.S. Cl.
CPC ................ *B08B 3/04* (2013.01); *B08B 1/006* (2013.01); *B60S 1/20* (2013.01); *B60S 1/0848* (2013.01);
(Continued)

(58) Field of Classification Search
CPC ................ B60S 1/56; B60S 1/48; B60S 1/44
See application file for complete search history.

(56) References Cited

U.S. PATENT DOCUMENTS 4,088,358 A    5/1978  Hirsch
9,126,534 B2 *  9/2015  Snider
(Continued)

FOREIGN PATENT DOCUMENTS

DE           2125259      12/1971
DE        102013213415    1/2015

OTHER PUBLICATIONS

International Search Report and Written Opinion dated Oct. 8, 2018 (PCT/NO2018/050163).

*Primary Examiner* — Michael D Jennings
(74) *Attorney, Agent, or Firm* — Alix, Yale & Ristas, LLP

(57) ABSTRACT

Apparatus for cleaning object surface, wherein the apparatus for cleaning object surface is adapted to be arranged to or accommodate an object, wherein the apparatus is arranged to supply cleaning fluid to the object surface, wherein the apparatus comprises a body provided with an opening with a circumferentially extending flexible part, flange or lip partly covering the object surface in circumferential direction thereof and in engagement with the object surface with a pretension force, and wherein the apparatus is arranged to supply cleaning fluid interior of the body and the flexible part, flange or lip is arranged to bend away from the object surface when subjected to cleaning fluid supplied interior of the body.

19 Claims, 14 Drawing Sheets

(51) Int. Cl.
  *B08B 3/04*   (2006.01)
  *B08B 1/00*   (2006.01)
  *B60S 1/20*   (2006.01)
  *B60S 1/08*   (2006.01)
  *B60S 1/56*   (2006.01)
  *G02B 27/00*  (2006.01)

(52) U.S. Cl.
  CPC .. *B60S 1/44* (2013.01); *B60S 1/52* (2013.01); *B60S 1/566* (2013.01); *G02B 27/0006* (2013.01)

(56) References Cited

U.S. PATENT DOCUMENTS

| | | |
|---|---|---|
| 9,180,840 B2 | 11/2015 | Tanaka et al. |
| 9,278,670 B2 | 3/2016 | Hattori et al. |
| 9,538,054 B2 | 1/2017 | Hayakawa et al. |
| 9,731,688 B2 * | 8/2017 | Doorley et al. |
| 9,783,167 B2 * | 10/2017 | Niemecyk |
| 2013/0146577 A1 | 6/2013 | Haig et al. |
| 2015/0344001 A1 | 12/2015 | Lopez Galera |
| 2016/0101735 A1 | 4/2016 | Trebouet |
| 2016/0103316 A1 | 4/2016 | Rousseau |
| 2016/0325715 A1 | 11/2016 | Niemczyk |
| 2017/0036650 A1 | 2/2017 | Hester et al. |

* cited by examiner

APPARATUS FOR CLEANING OBJECT SURFACE

BACKGROUND

The disclosed embodiments are related to an apparatus for cleaning object surface.

There has lately been an increased use of optic sensors to assists drivers of motor vehicles by arrangement of sensors, such as sensors for parking assistance, blind zone object detection, traffic lane departure, traffic signal identification, rear view mirror substitution etc., and cameras, such as reversing camera and similar.

Lately, there has also been an increasing focus on partly or entirely self-driving vehicles which, among others, is based on the use of the above-mentioned sensors. In such cases, it is extremely important that the sensors work as they are intended to.

The optic sensors are usually arranged to or on an exterior surface of the vehicle, such that they exhibit an optic surface, such as a lens surface or cover window/glass is disposed afore the lens surface, which will be exposed to foreign matter, such as insects, rain/raindrops, fog, mud, dust, snow or ice. There is accordingly a need to remove foreign matter adhered onto the surface of vehicle-mounted cameras or sensors.

Prior art reveals that there have been many attempts of providing cleaning devices for cleaning an optic surface of an optic sensor. Common for the most of these solutions is that they make use of a nozzle discharging washer fluid onto the optic surface from a distance from the surface of the sensor or camera.

US2016103316 A1 describes a cleaning device for cleaning a lens of a motor vehicle camera comprising a cleaning head arranged in a fixed position with respect to the camera. The cleaning head comprises an internal annular wall being arranged along the optical axis behind the lens and bearing cleaning means oriented towards the lens. The internal annular wall of the head is equipped with a plurality of nozzles via which a cleaning liquid is able to exit bound for the lens.

From US2016101735 A1 is known a cleaning device for cleaning a lens of a camera, using a cleaning head, wherein the cleaning device comprises drive means for driving the camera or the cleaning head, which are able to generate a relative displacement of the cleaning head with respect to the camera between a passive position in which the cleaning head is positioned outside of the image-capturing field of the camera, and an active position in which the cleaning head extends facing the lens so as to allow cleaning liquid to be ejected towards the said lens.

In US2015344001 A1 it is described a cleaning device for cleaning a vehicle-mounted optic surface, including a housing, the housing including an opening adapted to fit an optic surface, a fluid inlet arranged to take in washer fluid, and at least one fluid discharge port arranged to discharge washer fluid onto the optic surface, a first passage in fluidic communication with the fluid inlet and the at least one fluid discharge port so as to guide the washer fluid from the fluid inlet towards the at least one fluid discharge port and a protruding part that substantially surrounds the opening so as to define an inner wall.

U.S. Pat. No. 9,126,534 B2 describes a system to remove debris from a vehicle camera lens using washer fluid from the vehicle's washer system. The system analyzes a captured image and determines if the image is obstructed by debris. If the image is determined to be obstructed, the system automatically sprays the camera lens with fluid to remove the debris. The system also prevents the draining of the washer fluid due to a false obstruction reading or debris that does not come off after a few sprayings.

From US2013146577 A1 it is known a sensor or camera assembly for a vehicle comprises a housing that is mountable to a vehicle component. The sensor or camera is located within the housing and has an exterior facing surface. A defrost element is located proximate to the sensor or camera and is electrically connectable to a defrost system. The defrost element is arranged to defrost the surface of the sensor or camera. A nozzle is located proximate to the sensor or camera and is fluidly connectable to a washer system for the vehicle. The nozzle is arranged to direct a fluid from the washer system over the surface of the sensor or camera.

In U.S. Pat. No. 9,180,840 B2 is described a camera washing device having an air pump, a wash water tank storing wash water, an injection nozzle with an injection part, a junction joint having a high-pressure air passage and a wash water passage, and an electromagnetic valve. The air pump generates and supplies high-pressure air to the high-pressure air passage. When the control part instructs the electromagnetic valve to be switched to an open state, the wash water and the high-pressure air are mixed in the junction joint to generate water particles. The generated water particles are supplied to the injection nozzle. When the electromagnetic valve is switched to the open state after injecting the high-pressure air only to a lens of a rear camera, the injection part injects the water particles to the lens of the camera.

From U.S. Pat. No. 9,278,670 B2 is known an on-board optical sensor apparatus including an optical sensor with a lens, an optical sensor cover, and a controller. The optical sensor cover includes a holder holding the optical sensor and a washer nozzle. The washer nozzle performs a washing operation to wash a lens surface of the lens of the optical sensor or a glass surface of a cover glass located facing the lens by spraying a washer fluid, supplied from a washer fluid tank, onto the lens surface or the glass surface.

In U.S. Pat. No. 9,538,054 B2 is another example of the use of cleaning fluid and compressed air for cleaning of the lens of a vehicle-mounted camera, wherein the lens is further exhibiting special properties.

US2017036650 describes a low profile, integrated camera wash nozzle assembly readily and unobtrusively integrated into a vehicle's exterior trim surfaces. It is further described a system and nozzle assembly for cleaning an exterior objective lens or wide-angle sensor's exterior surface to remove accumulated debris sprays washer fluid at a selected shallow angle which is substantially transverse to the lenses central viewing axis. A low-profile conformal housing fixture is adapted to receive and aim a very compact fluidic circuit insert that can generate a wide spray which substantially covers the lens surface, despite being very close to the edge of the lens.

Example of other cameras that will have a need for cleaning e.g. surveillance cameras arranged in public spaces or tunnels, cameras arranged on vessels, crafts and the like. Presently there exists no suitable solutions for cleaning of the surface of such cameras.

Other examples of objects which would require cleaning is lights of a vessel or craft, such as headlights of a vehicle, which today only can be cleaned by spraying fluid directly on the object surface, possibly assisted by wipers.

Drawbacks of the prior art solutions are mainly that they spray cleaning fluid onto the surface from a distance and/or in an angle of the surface of the vehicle-mounted camera or sensor.

A further drawback of most of the solutions is that require a large amount of cleaning fluid for cleaning the surface of the camera or sensor.

Another drawback with many of the prior art solutions is that they utilize solutions which require movable parts to position the spray nozzle at a distance from the surface of the vehicle-mounted camera or sensor.

A drawback with many of the prior art solutions is further that that one with spraying of cleaning liquid alone is not able to clean the surface completely, but will leave a film which will result in that dust and fine particles will attach to the surface over time.

Another drawback with the prior art solutions, especially the ones with sprays cleaning liquid from a considerable distance is that the cleaning fluid will, when this is sprayed onto the lens, reduce the view of the camera or sensor during this operation.

Another disadvantage is that the prior art solutions suffer from that the used cleaning fluid will flow down on the vehicle exterior surface, something which will attract dust, mud and similar, which potentially could damage the paint of the vehicle, as well as resulting in a visual unattractive impression of the vehicle.

A further disadvantage with the prior art solutions is that they will only be suitable for the use on vehicle-mounted cameras and do not offer a solution that can be used for cleaning of other object surfaces.

SUMMARY

The disclosure provides an apparatus for cleaning object surface partly or entirely solving the above mentioned drawbacks of prior art.

Disclosed herein is an apparatus for cleaning object surface for improving function or visibility thereof.

The disclosure also provides an apparatus for cleaning object surface where cleaning fluid is supplied in contact with the object surface and remains in contact with the object surface until it is ejected away from the object surface.

The disclosed embodiments also provide an apparatus for cleaning object surface which use a flexible part, flange or lip partly covering the object surface in circumferential direction thereof and in engagement with the object surface with a pretension force ensuring that the cleaning fluid flows from a circumferential direction of the object surface and towards center of the object surface where it is ejected from the object surface.

The disclosed embodiments also provide an apparatus for cleaning object surface provided with a mechanical cleaning device providing both cleaning with cleaning fluid and physical cleaning of the object surface.

The disclosed embodiments also provide an apparatus for cleaning object surface provided with a mechanical cleaning assembly, which is moved with a more or less random pattern, or fixed pattern over the object surface.

The disclosed embodiments also provide an apparatus for cleaning object surface that can easily be arranged to and dismounted from an object.

The disclosed embodiments also provide an apparatus for cleaning object surface that is applicable in a wide range of applications.

The object to be cleaned can be any object requiring cleaning of the surface thereof. The object can e.g. be, but not limited to, sensor, camera, light, window, cover, signs, boards, signposts or similar.

The term sensor comprises any kind of sensor or camera that would have a need for cleaning of the surface thereof.

The term light comprises any kind of light, such as, but not limited to, lights of crafts or vehicles, such as headlights, brake light, reverse lamp, other lights associated with crafts or vehicles, that would have a need for cleaning of the surface thereof.

The term object surface also comprises surface of a cover glass/window located facing the object or a surface of a housing located facing the object.

The apparatus for cleaning object surface comprises a main body adapted to be arranged to or accommodate a part of the object. The main body will typically be mainly disc-shaped or cylinder-shaped, but can also exhibit other shapes.

The disclosed main body of the apparatus for cleaning object surface is provided with an opening with a circumferentially extending flexible part, flange or lip partly covering the object surface in circumferential direction thereof and in engagement with the object surface with a pretension force. The opening in the main body is adapted such that it do not limit the field of view/function of the object.

The disclosed apparatus for cleaning object surface is further arranged to supply cleaning fluid interior of the main body.

According to a further disclosed embodiment, the apparatus is arranged to supply cleaning fluid in a circumferential direction of the object surface.

Cleaning fluid is supplied in contact with the object surface and remains in contact with the object surface until it is ejected away from the object surface.

Further, the flexible part, flange or lip extending in circumferential direction of the opening of the main body is arranged to bend away from the object surface when subjected to cleaning fluid supplied interior of the main body.

The disclosed device allows cleaning fluid to flow from a circumferential direction of the object surface and towards center of the object surface where it is ejected mainly perpendicularly away from the object surface.

Supply of cleaning fluid in circumferential direction is according to one embodiment achieved by that the main body is provided with at least one through hole for supplying cleaning fluid in circumferential direction of the object surface.

The main body exhibits a shape and size adapted the relevant object the apparatus for cleaning object surface is to be used on.

According to an alternative embodiment, the main body is arranged to accommodate and enclose the object therein.

The apparatus for cleaning object surface can further comprise sealing means between the main body and the object, which in addition to providing a sealing barrier for cleaning fluid in the apparatus for cleaning object surface also can work as attachment means for the main body to the object.

In another disclosed embodiment, the main body of the apparatus for cleaning object surface is provided with an interior or exterior channel for supplying cleaning fluid to the at least one through hole in the main body.

In another embodiment, the apparatus for cleaning object surface further comprises a mechanical cleaning assembly comprising a mechanical cleaning device for physical cleaning of the object surface.

In one embodiment, the mechanical cleaning device is formed by an elastic element, such as a thread, wire, wiper, chain or similar.

According to a further embodiment, the mechanical cleaning device is arranged at one end to the main body and a driving unit at the other end, or arranged to a driving unit at both ends.

According to another embodiment, the mentioned driving unit(s) is/are driven by cleaning fluid or mechanically or electrically.

By this is achieved a mechanical cleaning device which will move over and in contact with the object surface with a more or less random or fixed pattern, and further ensure that parts of or the entire object surface is cleaned in only a few cycles.

According to a further embodiment of the apparatus, to ensure that the object surface is wetted by cleaning fluid when the mechanical cleaning device is used, the mechanical cleaning assembly further comprises a locking mechanism for the mechanical cleaning device. The locking mechanism will also ensure that the mechanical cleaning device is protected and positioned out of the field of view/function area for the object when cleaning is not performed.

Accordingly, the disclosure provides an apparatus for cleaning object surface with or without a mechanical cleaning assembly, which will have considerable advantages over prior art solutions.

The disclosed apparatus for cleaning object surface is compact and robust and contains no exterior movable parts.

The apparatus for cleaning object surface provides a solution being more effective than the prior art solutions due to that the cleaning fluid will be supplied in contact with the object surface and remains in contact with the object surface until it is ejected away from the object surface. This also results in that the amount of cleaning fluid required can be reduced.

Further, the use of a flexible part, flange or lip enclosing the object surface provides a solution, which is sealed at all time when not in use.

An apparatus is provided for cleaning object surface which in an easy manner can be arranged to and dismounted from an object.

The disclosure provides apparatus for cleaning object surface which can be adapted to any kind of existing or new object. Accordingly, the principle described herein can be adapted objects having different shapes, such as, but not limited to, mainly cylindrical, mainly quadratic, mainly rectangular, as well as objects having different surface shape, such as, but not limited to, convex, concave or planar.

The disclosed apparatus for cleaning object surface solves the problem of cleaning fluid flowing down on exterior surface of a structure where the object is arranged, by that the cleaning fluid is ejected away from the object surface.

The disclosed apparatus for cleaning object surface suitable for using any fluid, such as, but not limited to, steam, water, windscreen washer liquid and air or a combination of these.

The disclosed embodiments further achieve a solution, which also is capable of removing film or material deposited on the object surface, as well as water droplets.

The disclosure thus provides an apparatus that can be used for cleaning the surface of any kind of object.

BRIEF DESCRIPTION OF THE DRAWINGS

The present invention will below be described in further detail with references to the attached drawings, where.

DETAILED DESCRIPTION

Figure 1A:
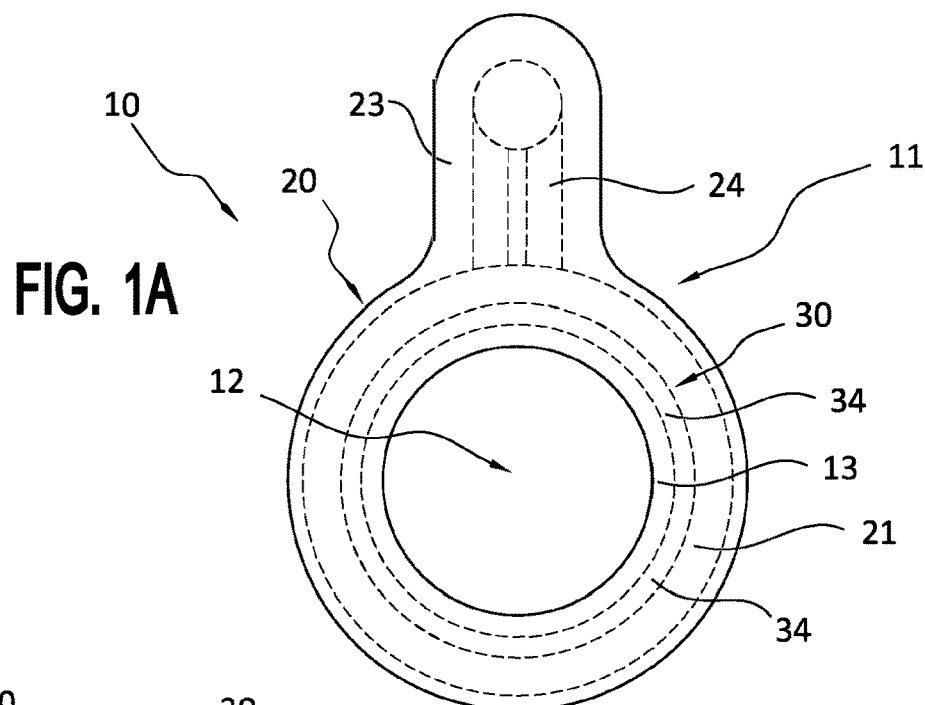
FIGS. 1A-1B are principle drawings of a first embodiment of an apparatus for cleaning object surface arranged to an object.

The disclosed apparatus 10 for cleaning object surface is formed by a main body 11 provided with an opening 12 with a circumferentially extending flexible part, flange or lip 13 partly covering an object surface 102 in circumferential direction thereof and in engagement with the object surface 102 with a pretension force. An object 100 will in the following example description comprise a body or housing 101, and wherein the object surface 102 will be the surface of the body or housing 101 or object 100 itself.

Figure 1B:
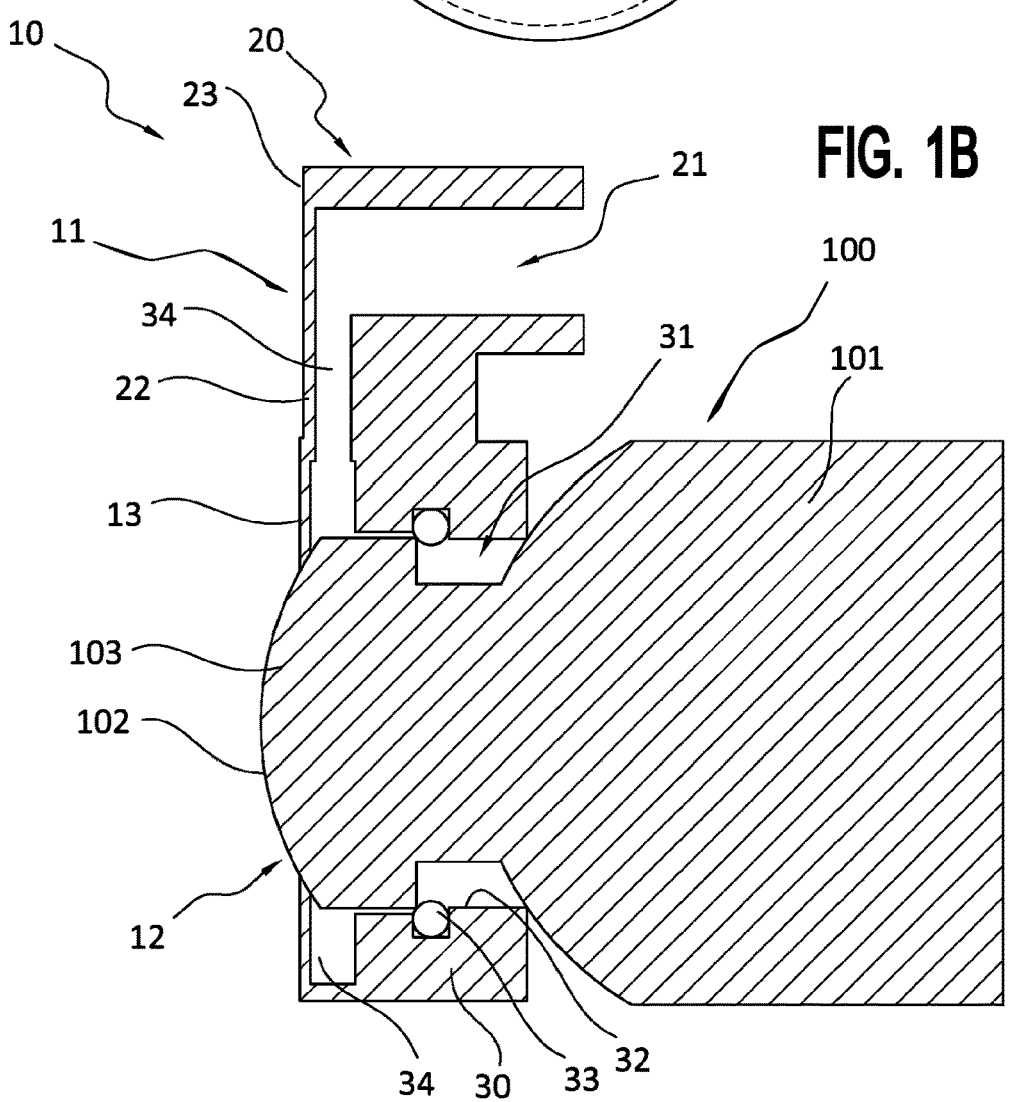

Reference is now made to FIGS. 1A-1B which are principle drawings of a first embodiment of an apparatus 10 for cleaning object surface. According to the first example embodiment, the apparatus 10 for cleaning object surface is adapted to be arranged to and accommodate a part of an object 100. In the shown example, the object 100 is camera, such as a vehicle-mounted camera. An object 100, such as a camera, is typically formed by a housing 101 arranged for accommodating a camera with a lens 103, wherein the lens 103 is e.g. mainly circular as shown, and wherein surface of the lens 103 forms the object surface 102, e.g. with a convex shape, as shown in the example. In connection with the example, which is a vehicle-mounted camera, the camera will typically be arranged in connection with a vehicle exterior surface. The object surface 102 will thus be subject to foreign matter, such as dust, rain, snow, fog, ice, mud, etc., limiting the function or visibility of the object 100, i.e. camera.

According to the first disclosed embodiment, the apparatus 10 for cleaning object surface is formed by a main body 11 adapted to be arranged to and accommodating a part of the object 100, in the shown example the lens 103 of the camera. In the shown embodiment, the main body 11 is formed by a housing 20 and a mainly disc-shaped body 30 integrated with the housing 20 to form one unit. In the shown example, the mainly disc-shaped body 30 is provided with an inner centrally through hole 31 adapted for being arranged to and accommodating a part of the object 100, in the shown example the lens 103 of the camera, and wherein inner wall 32 of the inner centrally through hole 31 is provided with sealing means 33, such as an O-ring, for providing a sealed barrier between the object 100, i.e. lens 103, and the mainly disc-shaped body 30, in circumferential direction of the object 100, i.e. lens 103. The sealing means 33 will in this embodiment also work as attachment means for the mainly disc-shaped body 30 to the object 100, i.e. camera.

The apparatus 10 for cleaning object surface is further provided with cleaning means for cleaning the object surface 102 by that the apparatus 10 is arranged for supply of cleaning fluid interior of the main body 11. In the shown embodiment this is achieved by that the mainly disc-shaped body 30 is provided with at least one through hole 34, in the shown embodiment at least two through holes 34 distributed in circumferential direction thereof, for supplying cleaning fluid in circumferential direction of the object surface 102, i.e. surface of the lens 103 in the example. The housing 20 of the apparatus 10 is further in the shown embodiment provided with a channel 21 extending in circumferential direction of the housing 20 enclosing the at least one through hole 34 of the mainly disc-shaped body 30 and in fluid communication with the at least one through hole 34 for supplying cleaning fluid to the at least one through hole 34 in the mainly disc-shaped body 30. The channel 21 and at least one through hole 34 of the mainly disc-shaped body 30 are arranged close to exterior wall 22 of the housing 20.

The opening 12 of the main body 11 is in this embodiment arranged in the exterior wall 22 of the housing 20, arranged in correspondence with the through hole 31, wherein the opening 12 has a smaller diameter than the diameter of the inner through hole 31, wherein the diameter of the opening 12 is adapted to the field of view/function area of the object 100, i.e. field of view of the lens 103 in the shown example.

Accordingly, when the apparatus 10 for cleaning object surface is arranged to the object 100, i.e. the camera in the shown embodiment, the apparatus 10 for cleaning object surface is enclosing and accommodating a part (i.e. the lens 103) of the object 100, such that exterior wall 22 lies onto the object surface 102, in circumferential direction thereof.

At least a part, flange or lip 13 of the opening 12, i.e. exterior wall 22 surrounding the object surface 102 is formed by a flexible material or a material exhibiting flexible properties, and lying onto the object surface 102 with a pretension force. By that the flexible part, flange or lip 13 of the opening 12, i.e. exterior wall 22, is formed by a flexible material or a material exhibiting flexible properties the flexible part, flange or lip 24 is adapted to be manipulated by cleaning fluid pressure in the main body 11 of the apparatus 10 such that it bends away from the object surface 102 with the free end when subjected to cleaning fluid supplied interior of the main body 11, in the shown embodiment via the at least one through hole 34 of the mainly disc-shaped body 30.

The apparatus 10 for cleaning object surface is further arranged to a cleaning fluid supply, which according to the shown embodiment is achieved by that the housing 20 is provided with an extension 23 at one side for connecting the channel 21 to a supply channel 24 for cleaning fluid. E.g. the supply channel 24 can, in the mentioned example of vehicle-mounted camera, be arranged to a supply system for cleaning of windshield, rear window or light of a vehicle, such that when cleaning fluid is supplied to the windshield, rear window or lights of a vehicle, cleaning fluid is also supplied to the apparatus 10 or by separate control. Alternatively, the apparatus 10 for cleaning object surface is arranged to a separate supply for supply of cleaning fluid.

Accordingly, the apparatus 10 for cleaning object surface according to the above described embodiment works such that when cleaning fluid is supplied to the object surface 102 via the at least one through hole 34 in the mainly disc-shaped body 30, in circumferential direction of the object surface 102, the flexible part, flange or lip 13 of the opening 12/exterior wall 22 will, due to pressure of the supplied cleaning fluid, be lifted at the free end thereof from the object surface 102, resulting in that cleaning fluid will flow from circumferential direction of the object surface 102 and towards centre of the object surface 102, whereupon the cleaning fluid will be ejected away from the object surface 102 along longitudinal axis of the object 100. It should further be mentioned that opening 12/exterior wall 22 via the flexible part, flange or lip 13 will seal against the object surface 102 when cleaning is not performed.

Figure 2:
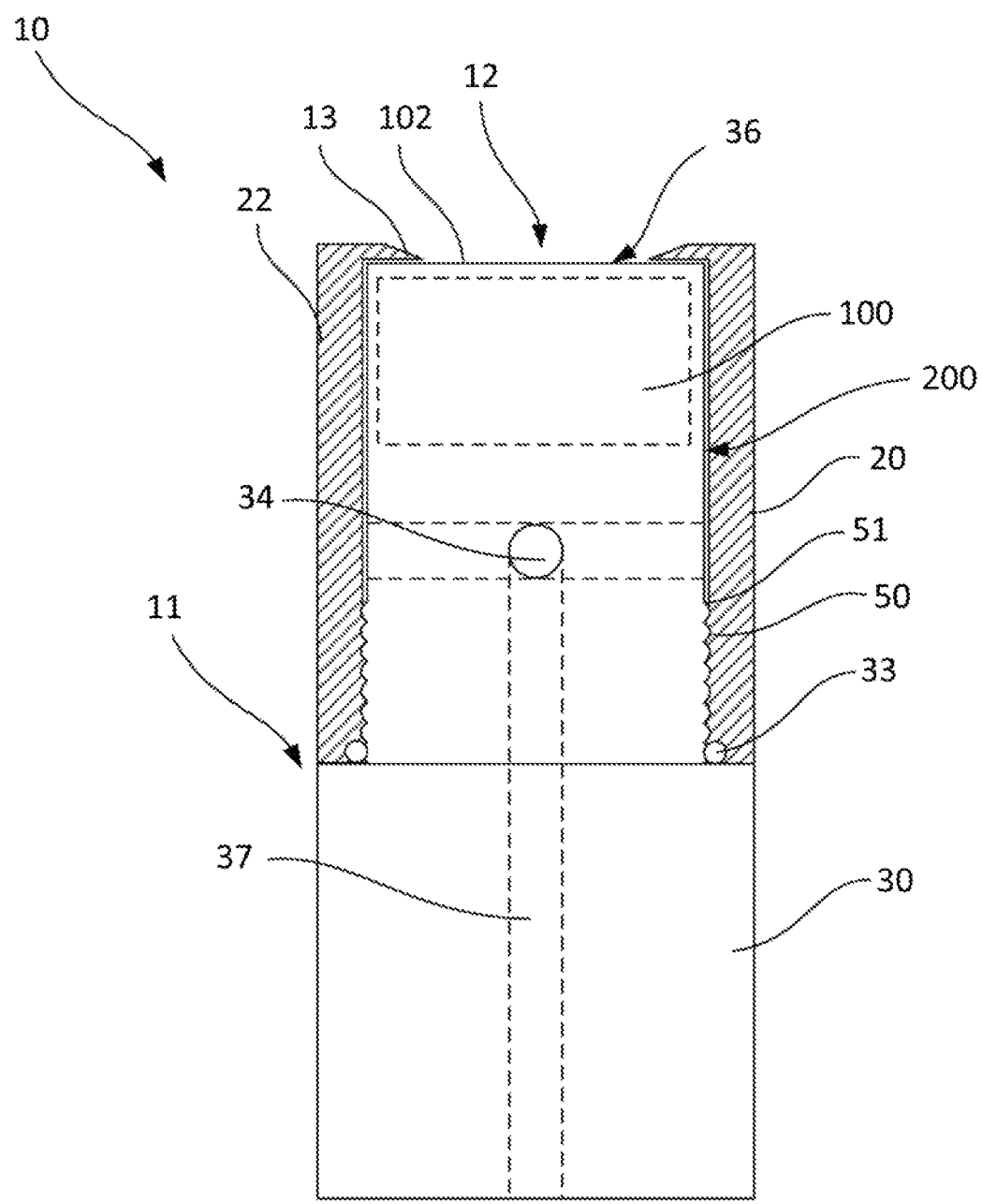
FIG. 2 is a principle drawing of second embodiment of an apparatus for cleaning object surface.

Reference is now made to FIG. 2 which is a principle drawing of an embodiment of the apparatus 10 for cleaning object surface adapted for use with an object 100 in the form of a sensor. The main body 11 of the apparatus 10 according to this embodiment is formed by a mainly cylinder-shaped body 30 adapted to receive and accommodate the object 100, i.e. the sensor, at a closed or open end 36 thereof. The housing 20 is in this embodiment mainly cylinder-shaped and adapted for arrangement to the mainly cylinder-shaped body 30 by that the mainly cylinder-shaped housing 20 and mainly cylinder-shaped body 30 are provided with corresponding connection means in the form of threads 50, 51, respectively. In the shown embodiment, the mainly cylinder-shaped body 30 exhibits a part with a smaller diameter and wherein the part with smaller diameter is provided with exterior threads 51, at lower end thereof. The mainly cylinder-shaped housing 20 is at lower part of the mainly cylinder-shaped housing 20 provided with interior threads 50, adapted for engagement with the exterior threads 51 of the mainly cylinder-shaped body 30 such that the mainly cylinder-shaped housing 20 can be fixed to the mainly cylinder-shaped body 30 via the interaction of the threads 50, 51.

The exterior diameter of the mainly cylinder-shaped body 30 and the interior diameter of the cylinder-shaped housing 20 are adapted such that there is provided an annulus 200 between the mainly cylinder-shaped body 30 and the mainly cylinder-shaped housing 20 when they are arranged together, and wherein there is arranged sealing means 33, such as an O-ring, at lower part of the annulus 200 providing a sealed barrier at lower side of the apparatus 10/main body 11.

The mainly cylinder-shaped body 30 is further provided with at least one through hole 34, preferably at least two through holes 34, diametrically arranged in circumferential direction thereof for supplying cleaning fluid to the annulus 200, preferably at a lower part thereof. The mainly cylinder-shaped body 30 is further provided with an interior cleaning fluid supply channel 37 for supplying cleaning fluid to the at least one through hole 34.

As in the previous described embodiment the main body 11 is provided with an opening 12 in the housing 20 provided with a part, flange or lip 13 exhibiting a smaller diameter than the interior diameter of the mainly cylinder-shaped housing 20, as described for the prior embodiments. The flexible part, flange or lip 13 is also in this embodiment formed by a flexible material or material exhibiting flexible properties, and lying onto the objects surface 102, which in this embodiment is the upper end of the body 30/object surface 102 with a pretension force, as well as allowing the flexible part, flange or lip 13 to bend away from the end/object surface 102, and thus object 100 arranged therein, with the free end when subjected to cleaning fluid supplied to the annulus 200 via the at least one through hole 34.

The channel 37 of the mainly cylinder-shaped body 30 is, e.g. for an object 100 in the form of a vehicle-mounted sensor, arranged to a supply system for cleaning of windshield, rear window or light of a vehicle, such that when cleaning fluid is supplied to the windshield, rear window or lights of a vehicle, cleaning fluid is also supplied to the apparatus 10 or by separate control. Alternatively, the apparatus 10 for cleaning object surface is arranged to a separate supply for supply of cleaning fluid.

Accordingly, the apparatus 10 for cleaning object surface according to the embodiment adapted for enclosing an object 100 works similar to the prior described embodiments by that that when cleaning fluid is supplied to the annulus 200 via the at least one through hole 34, the flexible part, flange or lip 13 will, due to pressure of the supplied cleaning fluid, be lifted at the free end thereof from the object surface 102, and accordingly the object 100, resulting in that cleaning fluid will flow from a circumferential direction and towards center of the object surface 102, whereupon the cleaning fluid will be ejected away from the object surface 102 along longitudinal axis of the object 100/mainly cylinder-shaped body 30. It should further be mentioned that the flexible part, flange or lip 13 of the main body 11/exterior wall 22 of the housing 20 due to the pretension force will seal against the object surface 102 of the mainly cylinder-shaped body 30 or object 100 when cleaning is not performed.

It should be mentioned that cleaning fluid in the form of liquid, (compressed) air or steam are suitable in this embodiment.

The apparatus 10 for cleaning object surface according to this embodiment is suitable for implementation in e.g. a vehicle, in the same manner as a sensor is arranged according to prior art.

Figure 3:
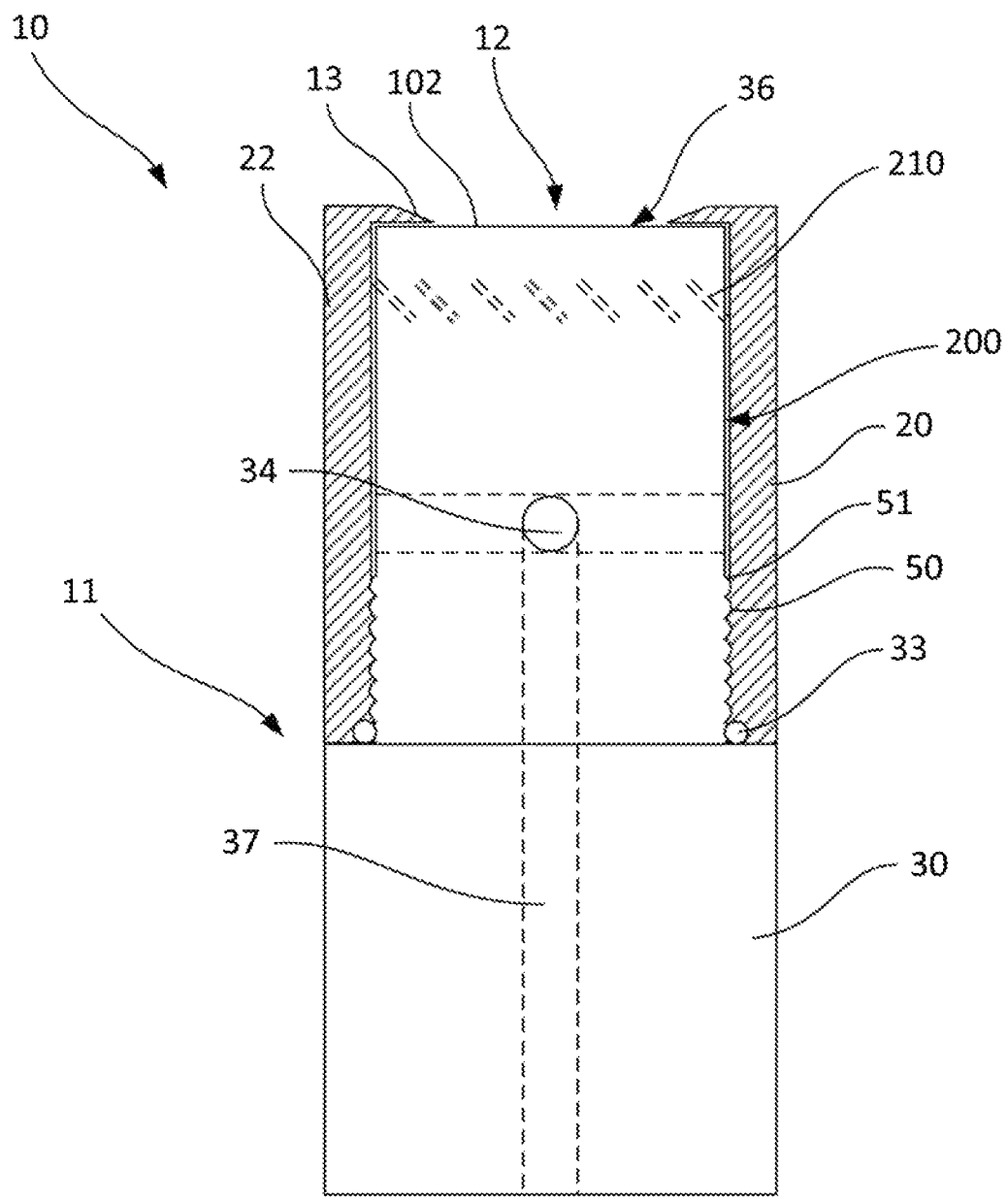
FIG. 3 is a principle drawing of an alternative embodiment of the apparatus in FIG. 2, FIGS. 4A-4B are principle drawings of a further embodiment of the apparatus for cleaning object surface.

Reference is now made to FIG. 3 which is a principle drawing of an alternative embodiment of the embodiment in FIG. 2. In this embodiment the housing 20 at inner circumference thereof or the cylinder-shaped body 30 at exterior circumference thereof is provided with deflectors 210 or nozzles inclined in relation to the horizontal plane. The inclination of the deflectors 210 or nozzles will provide a rotation of the supplied fluid in the annulus 200 resulting in a whirling motion of the fluid towards the flexible part, flange or lip 13 and the opening 12 thereof. This whirling motion would e.g. be favorable for removing snow or ice attached to the object surface 102.

Figure 4A:
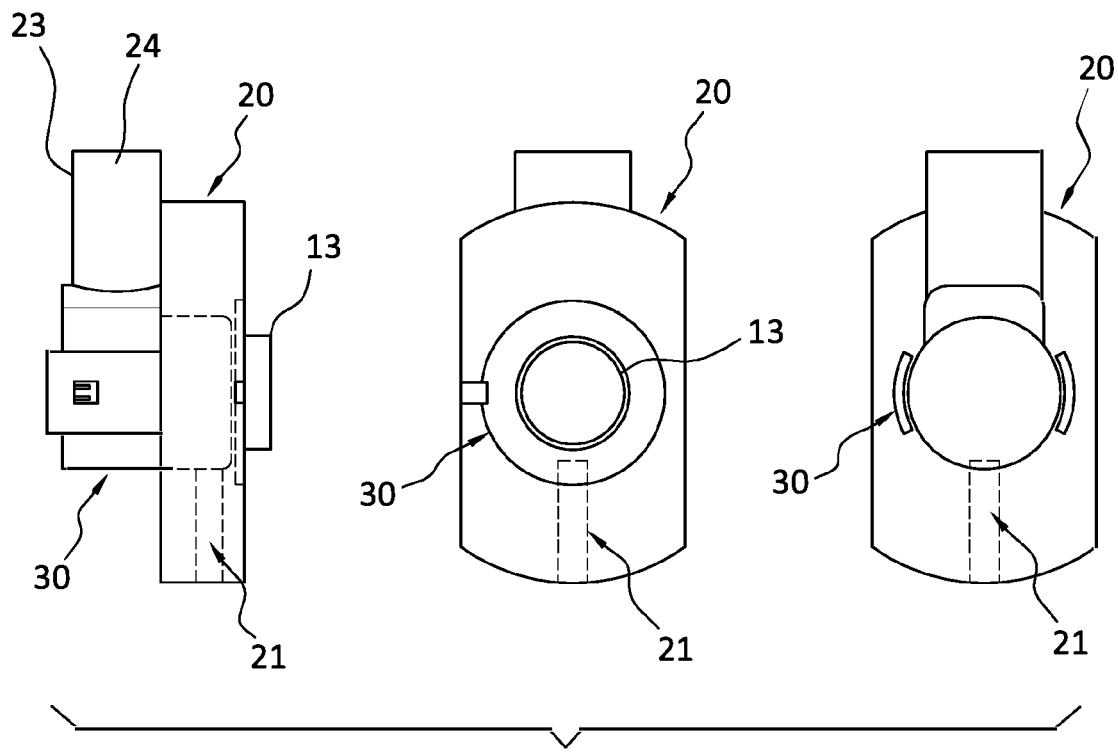
Figure 4B:
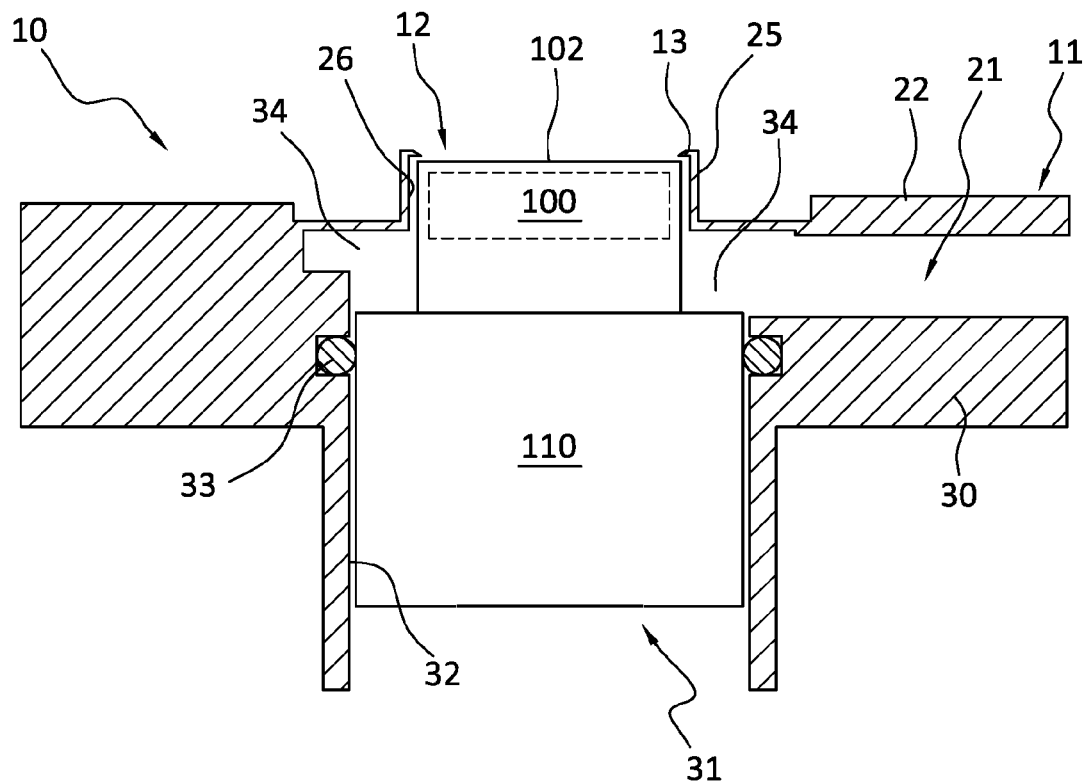

Reference is now made to FIGS. 4A-4B which show principle drawings of an alternative embodiment of the apparatus 10 for cleaning object surface adapted for use with an object 100 arranged in an object housing 110. In the shown embodiment the mainly disc-shaped body 30 constitutes an integrated part of the housing 20. In this embodiment the flexible part, flange or lip 13 of the main body 11/exterior wall 22 of the housing 20 is arranged at end of a protruding part 25, extending mainly perpendicularly from the exterior wall 22, and positioning the flexible part, flange or lip 13 in a parallel horizontal plane of the exterior wall 22. Inner wall 26 of the protruding part 25 can further be provided with spacers (not shown) in circumferential direction thereof for centering the object 100/object housing 110. In this embodiment, the part 25 is also formed by a flexible material or material exhibiting flexible properties.

Accordingly, this embodiment will work similar to the embodiment of FIGS. 1A-1B. Further, it should be mentioned that cleaning fluid in the form of liquid, (compressed) air or steam are suitable in this embodiment.

Figure 5A:
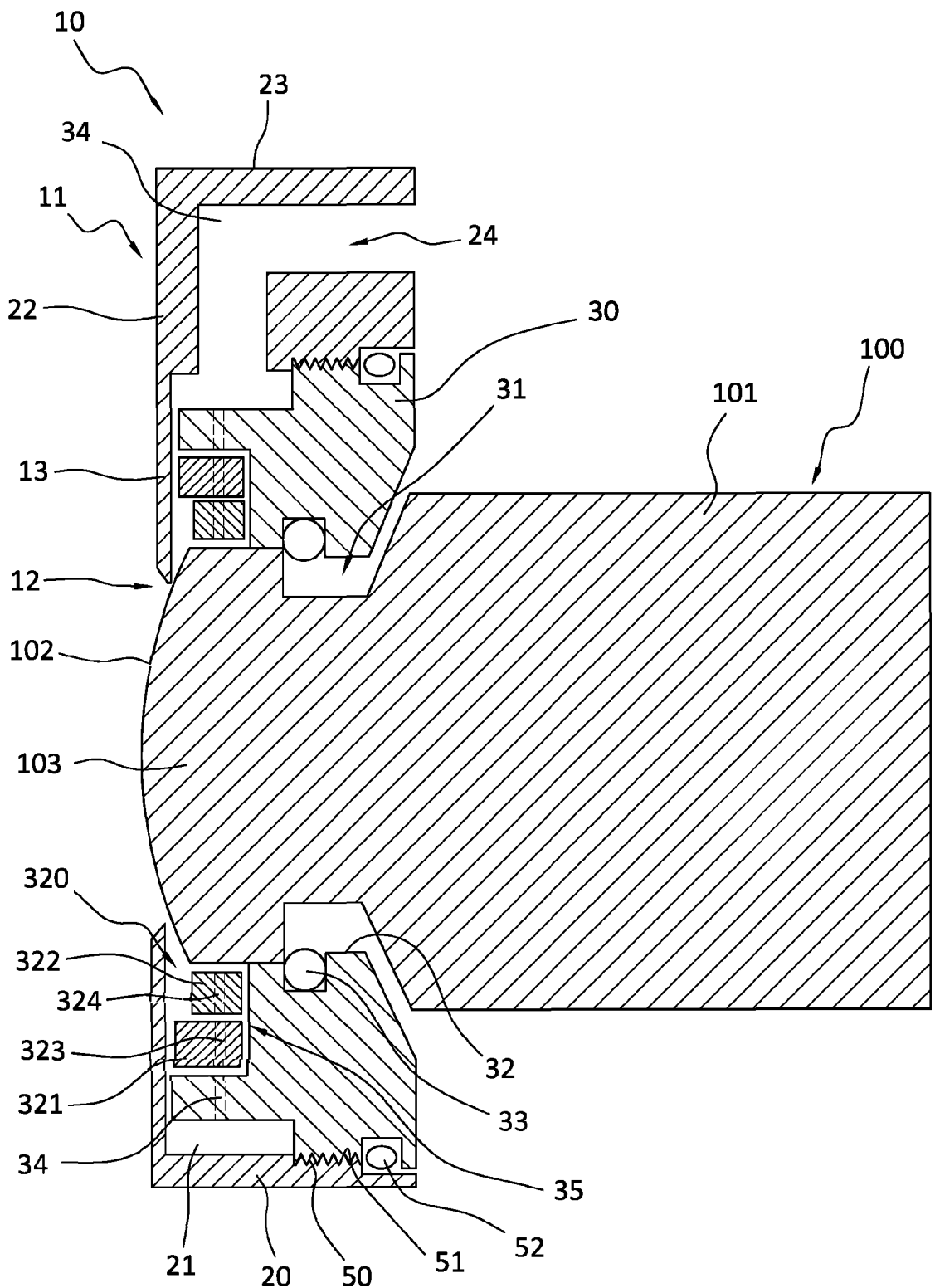
FIGS. 5A-5C are principle drawings an embodiment of the apparatus for cleaning object surface provided with a mechanical cleaning assembly.
Figure 5B:
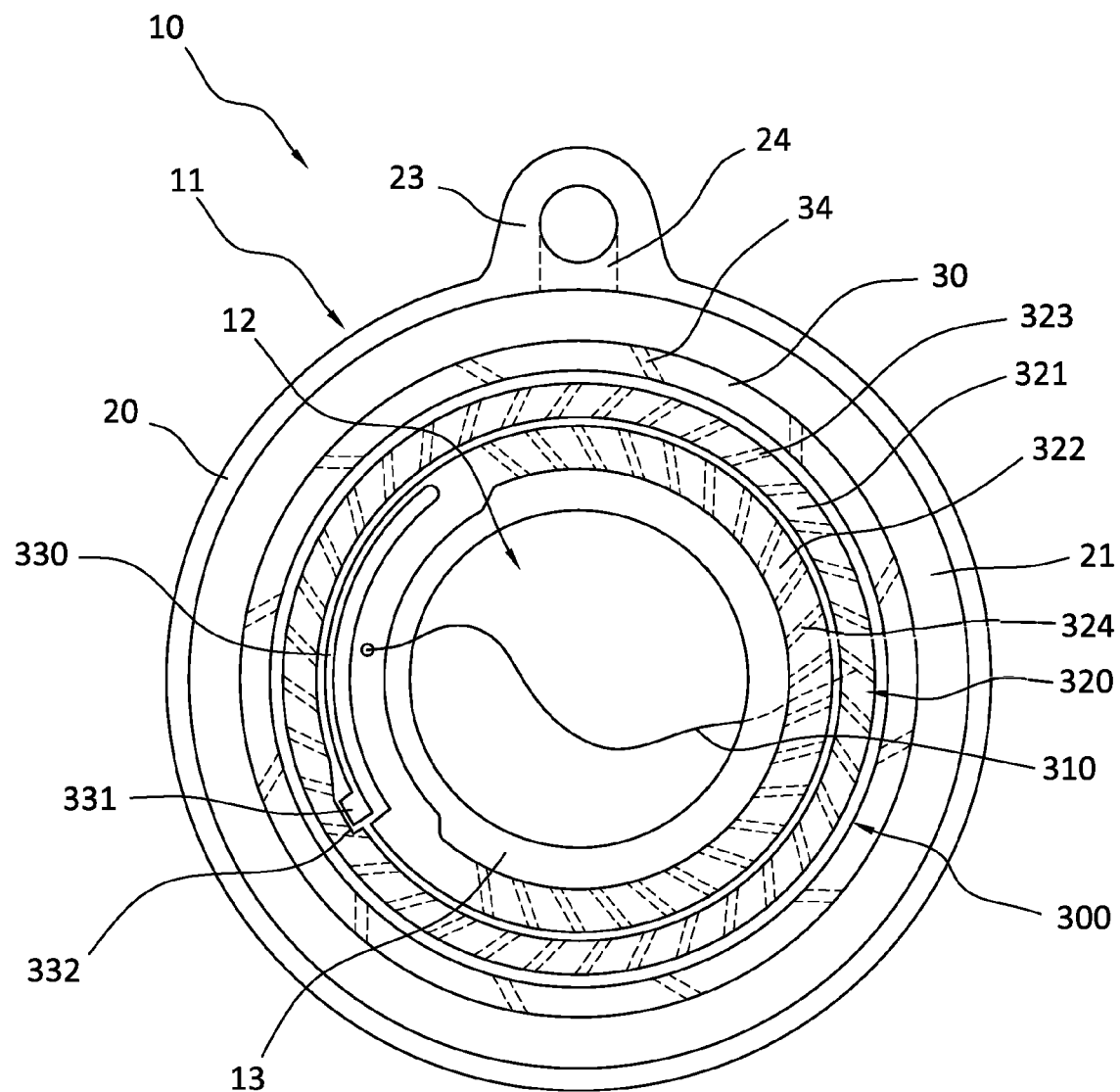
Figure 5C:
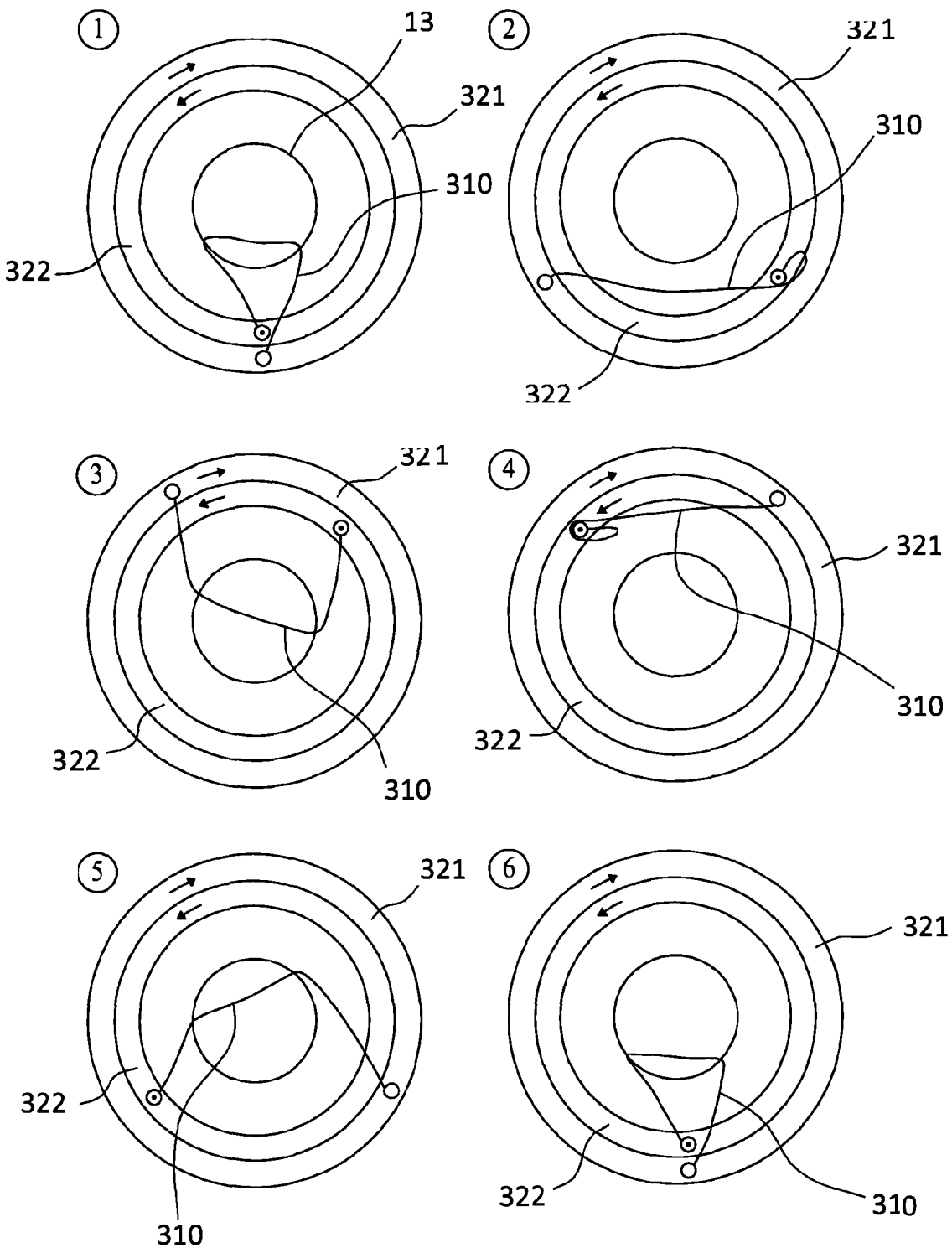

Reference is now made to FIGS. 5A-5C showing principle drawing of a modified embodiment of the apparatus 10 for cleaning object surface 102 shown in FIGS. 1A-1B. In the modified embodiment, the apparatus 10 for cleaning object surface in addition to cleaning the object surface 102 with cleaning fluid is also arranged for physical cleaning of the object surface 102 by means of a mechanical cleaning assembly 300.

The apparatus 10 for cleaning object surface according to the modified embodiment includes the same features as described for the embodiment described under FIG. 1A-1B, i.e. the housing 20 and mainly disc-shaped body 30 and associated parts.

In this embodiment the housing 20 is arranged to the mainly disc-shaped body 30 by means of corresponding connection means in the form of threads 50 and 51, respectively, arranged at inner circumference of the housing 20 and outer circumference of the mainly disc-shaped body 30. There is further preferably arranged sealing means 52, such as an O-ring, for providing a sealed barrier lower side of the apparatus 10 for cleaning object surface.

The mainly disc-shaped body 30 is further arranged for accommodating the mechanical cleaning assembly 300. The mechanical cleaning assembly 300 is in this embodiment formed by a mechanical cleaning device 310 and a driving unit 320. The driving unit 320 is in this embodiment fluid driven, i.e. driven by cleaning fluid.

The driving unit 320 comprises at least one rotor 321-322. In the shown embodiment, the driving unit 320 comprises an outer rotor 321 in the form of a mainly disc-shaped turbine wheel, and an inner rotor 322 in the form of a mainly disc-shaped turbine wheel.

In this embodiment the at least one through hole 34 in the mainly disc-shaped body 30 is inclined, wherein longitudinal center axis through the at least one inclined through hole 34 exhibits an angle deviating from a central axis through the mainly disc-shaped body 30.

The outer rotor 321 is arranged to be accommodated and rotate within the mainly disc-shaped body 30, which outer rotor 321 is provided with inclined through holes 323 for providing the interior of the mechanical cleaning assembly 300 with cleaning fluid, wherein longitudinal center axis through the inclined through holes 323 exhibit an angle deviating from a central axis through the mainly disc-shaped body 30, wherein the inclined through holes 323 deviate in the opposite direction of the at least one inclined through hole 34 of the mainly disc-shaped body 30.

The inner rotor 322 is arranged to be accommodated and rotate within the outer rotor 321, which inner rotor 322 is provided with inclined through holes 324 for providing the interior of the mechanical cleaning assembly 300 with cleaning fluid, wherein longitudinal center axis through the inclined through holes 324 exhibit an angle deviating from a central axis through the mainly disc-shaped body 30, wherein the inclined through holes 324 deviate in the opposite direction of the through holes 323 of the outer rotor 321.

Accordingly, the outer 321 and inner 322 rotor are arranged to rotate in an annular recess 35 in the mainly disc-shaped body 30 due to supply of cleaning fluid and the inclined holes 34, 323 and 324.

The mechanical cleaning assembly 300 is further provided with a locking mechanism. In the shown embodiment, this is achieved by that the inner rotor 322 is provided with an elastic lock element 330 with an extension along a part of the outer circumference of the inner rotor 322. The elastic lock element 330 is fixed to the inner rotor 322 at one end and free at the other end, allowing it to be manipulated by cleaning fluid pressure in the mechanical cleaning assembly 300. The elastic lock element 330 is at the free end provided with a protruding locking element 331 adapted to be received in a locking recess 332 arranged in the inner circumference of the outer rotor 321. The locking recess 332 is preferably tapered from one end to ensure that the protruding element 331 safely comes into engagement with the locking recess 332. Accordingly, the elastic lock element 330 is designed such that it exhibits a pretention force, which initially ensure that the protruding locking element 331 is in engagement with the locking recess 332.

The mechanical cleaning device 310 is preferably in the form of an elastic element, such as thread, wire, wiper, chain or similar, arranged/fixed to the outer rotor 321 at one end and arranged/fixed to the inner rotor 322 at the other end. By means of the locking mechanism, it is ensured that mechanical cleaning device 310 will not be activated until cleaning fluid is present at the object surface 102 and further ensure that the mechanical cleaning device 310 will be positioned outside the field of view/function area of the object surface 102 when cleaning is not performed.

The apparatus 10 for cleaning object surface with the mechanical cleaning assembly 300 works in the way that when cleaning fluid is supplied via the supply channel 21, the cleaning fluid will flow into the at least one inclined through hole 34 of the mainly disc-shaped body 30, and further into the inclined through holes 323 of the outer rotor 321 and into the through holes 324 of the inner rotor 322 and flow from the circumference of the object surface 102 and towards center of the object surface 102. When the pressure of the cleaning fluid in the mechanical cleaning assembly 300 has reached a certain pressure, the protruding locking element 331 of the elastic lock element 330 will be forced out of engagement with the locking recess 332 of outer rotor 321 resulting in that the inner 322 and outer 321 rotor will start to rotate. The rotation of the outer rotor 321 and inner rotor 322 will result in that the mechanical cleaning device 310 will start to move in a more or less random or fixed pattern by that the fixed ends of the mechanical cleaning device 310 in the outer rotor 321 and inner rotor 322 rotate, at the same time as the mechanical cleaning device 310 will be affected by the flow of cleaning fluid over the object surface 102. The outer 321 and inner 322 rotor will rotate in the opposite directions or in the same direction. When rotated in the same direction it will be preferable that they are rotated with different rotational velocity. The rotational velocity will depend on the size of the respective inclined through holes, as well as the number of inclined through holes in the respective rotor, as well as the mainly disc-shaped body 30. Accordingly, the locking mechanism 330 of the mechanical cleaning device 310 will be cleaning fluid activated, ensuring that the mechanical cleaning device 310 will not move in relation to the object surface 102 before the object surface 102 is wetted which is achieved by that a certain pressured is required to allow rotation of the rotors 321-322.

Reference is made to FIG. 5C which show principle drawings of a time series of how the mechanical cleaning device 310 will exhibit a different pattern depending how the fixation/arrangement points of the mechanical cleaning device 310 in the outer rotor 321 and inner rotor 322 are positioned in relation to each other. Accordingly, depending on the position of the fixation/arrangement points of the mechanical cleaning device 310 in the inner rotor 322 and outer rotor 321, the mechanical cleaning device 310 will be tightened and loosened in a random or fixed pattern ensuring that the object surface 102 will be cleaned from any film or material deposited thereon, as well as water droplets.

Accordingly, in only a few cycles the mechanical cleaning device 310 will have been drawn over the entire object surface 102.

When the cleaning fluid supply is cut, the inner rotor 322 will stop to rotate when the pressure of the cleaning fluid drops to a certain pressure, whereupon the pretension force in the elastic lock element 330 will result in that the outer rotor 321 is stopped by that the locking element 331 comes into engagement with the locking recess 332 and at the same time the mechanical cleaning device 310 will be in a position outside the field of view/function area object 100.

Figure 6A:
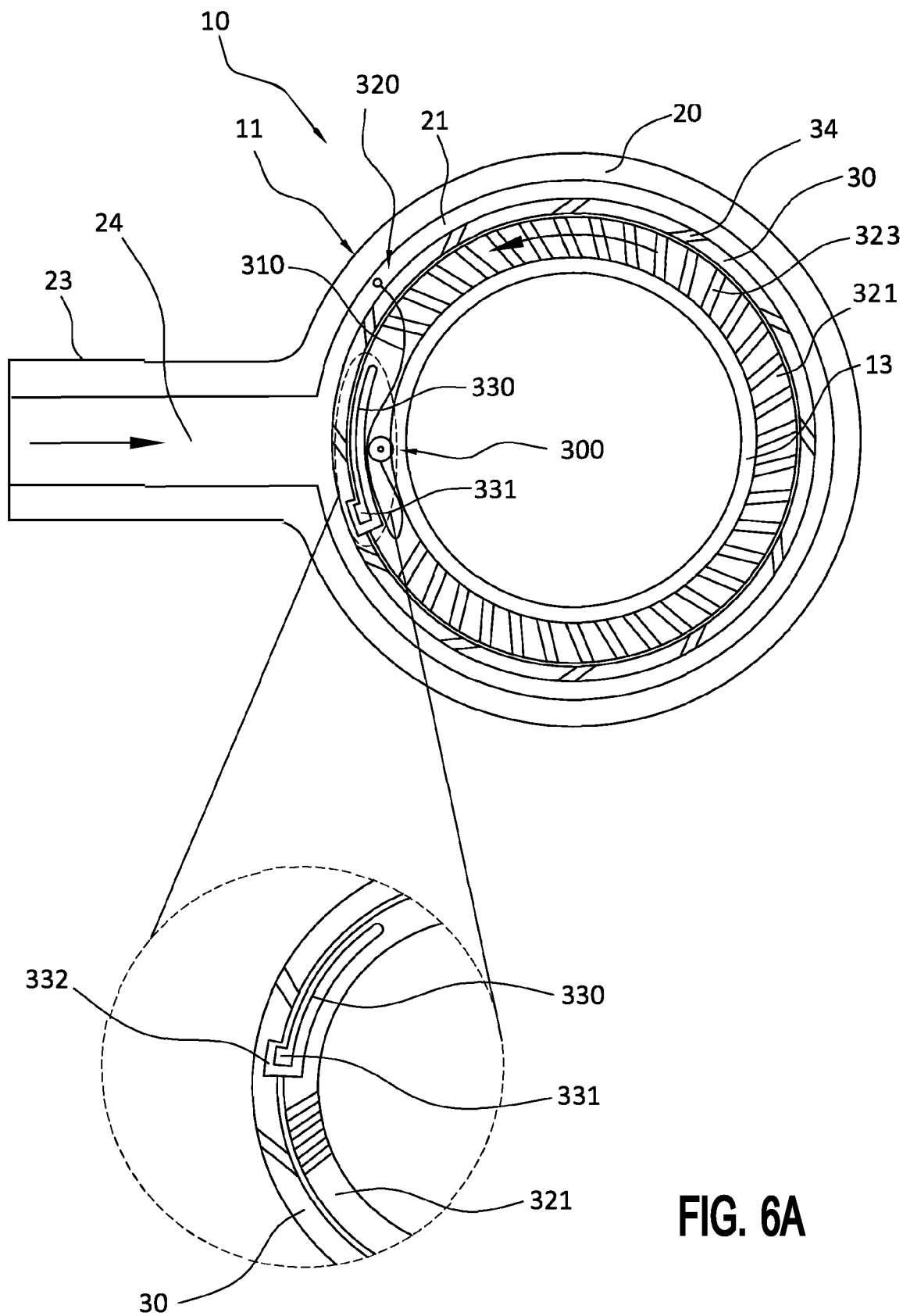
FIGS. 6A-6B are principle drawings of an alternative embodiment of the apparatus for cleaning object surface provided with a mechanical cleaning assembly.
Figure 6B:
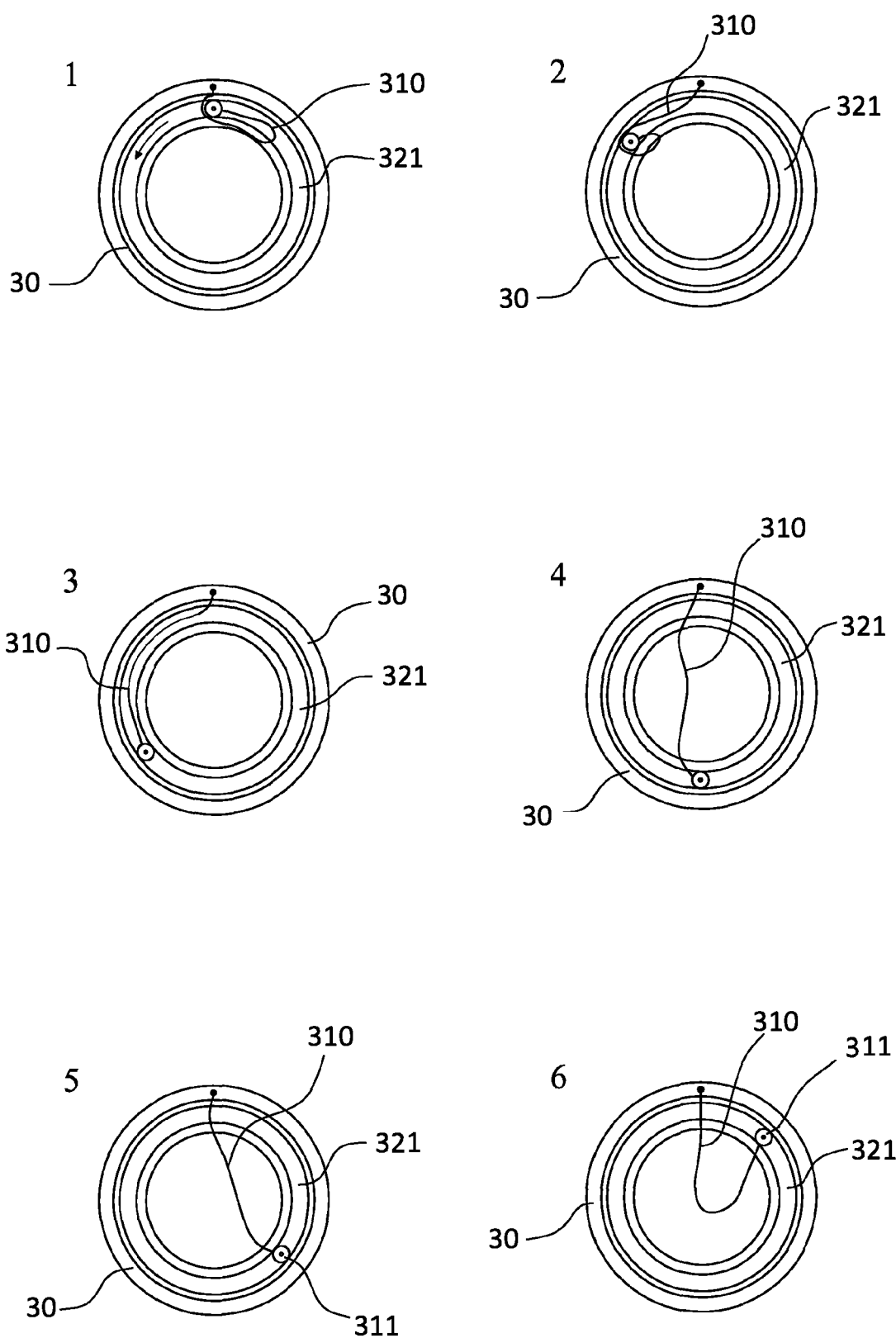

Reference is now made to FIGS. 6A-6B which is a principle drawing of an alternative embodiment of the apparatus 10 for cleaning object surface with mechanical cleaning assembly 300 in FIGS. 5A-5B. The apparatus 10 for cleaning object surface according to this embodiment includes the same features as described for the embodiment in FIGS. 1A-1B and 5A-5C as regards the housing 20 and the mainly disc-shaped body 30.

The mechanical cleaning assembly 300 in this embodiment comprises a driving unit 320 comprising only one rotor 321. As for the embodiment in FIGS. 5A-5C the mainly disc-shaped body 30 is provided with at least one inclined through hole 34 and the rotor 321 is arranged to be accommodated and rotating in the mainly disc-shaped body 30, and wherein the at least one inclined through hole 323 of the rotor 321 deviate in the opposite direction of the at least one inclined through hole 34 of the mainly disc-shaped body 30.

The rotor 321 comprises as above an elastic lock element 330 with an extension along a part of the outer circumference of the rotor 321, but the locking recess 332 is in this embodiment arranged at the inner circumference of the mainly disc-shaped body 30. Further, in this embodiment the mechanical cleaning device 310 is fixed inside the housing 20 or to the body 30 at one side, i.e. unlike the embodiment in FIGS. 5A-5C, and will not rotate, but will be stationary at all time. The other end arranged to the rotor 321 will move and provide a more or less random or fixed pattern for movement of the mechanical cleaning device 310 over the object surface 102, as shown in FIG. 6B. The mechanical cleaning assembly 300 will work similarly as the embodiment described in FIGS. 5A-5C, by that the cleaning fluid will flow through the at least one inclined through hole 34 of the mainly disc-shaped body 30 and inclined through holes 323 of rotor 321 and when a certain cleaning fluid pressure is achieved the protruding element 331 of the elastic lock element 330 is released from engagement with the locking recess 332. As the rotor 321 rotates this will result in that one end of the mechanical cleaning device 310 is provided with a circumferential movement which will result in a more or less random or fixed pattern of the mechanical cleaning device 310 over the object surface 102.

Figure 7A:
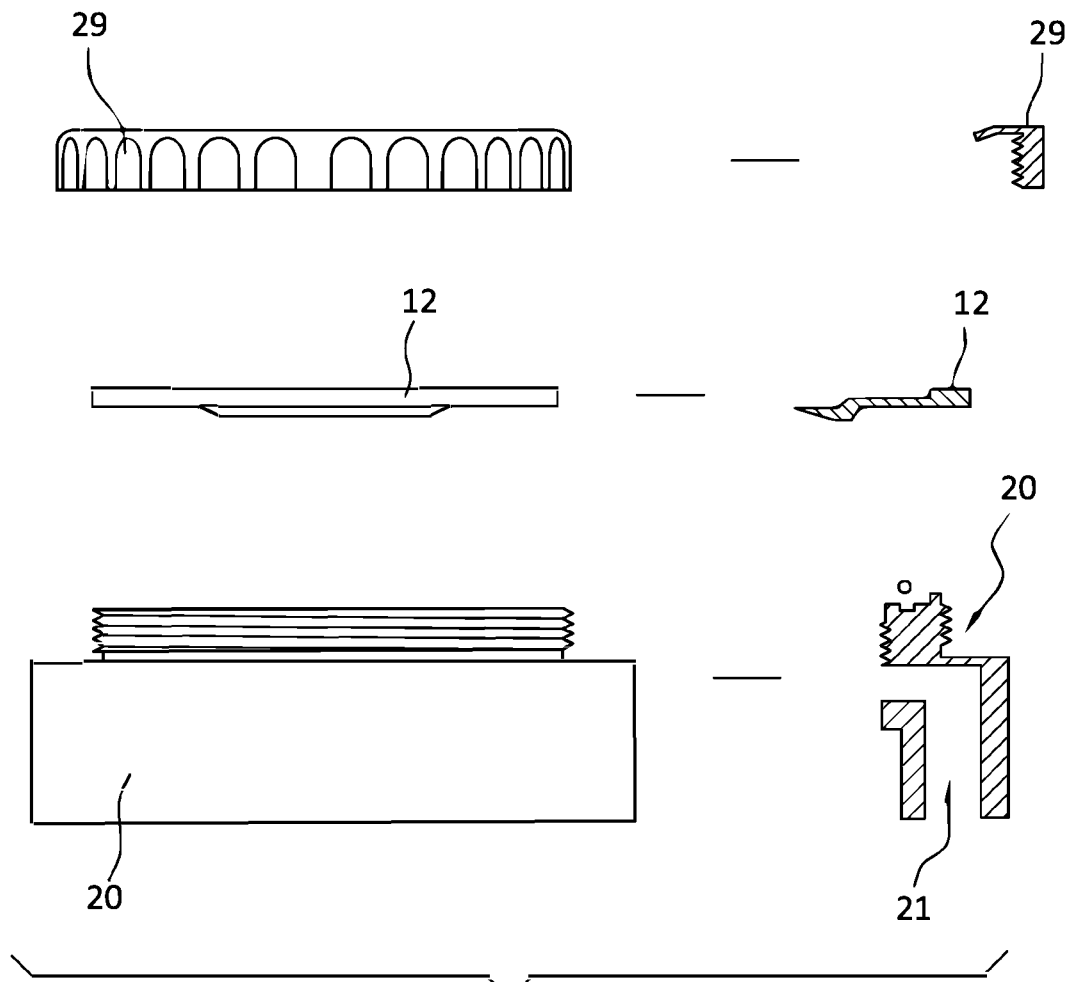
FIGS. 7A-7B are principle drawings of a further alternative embodiment of the apparatus for cleaning object surface.
Figure 7B:
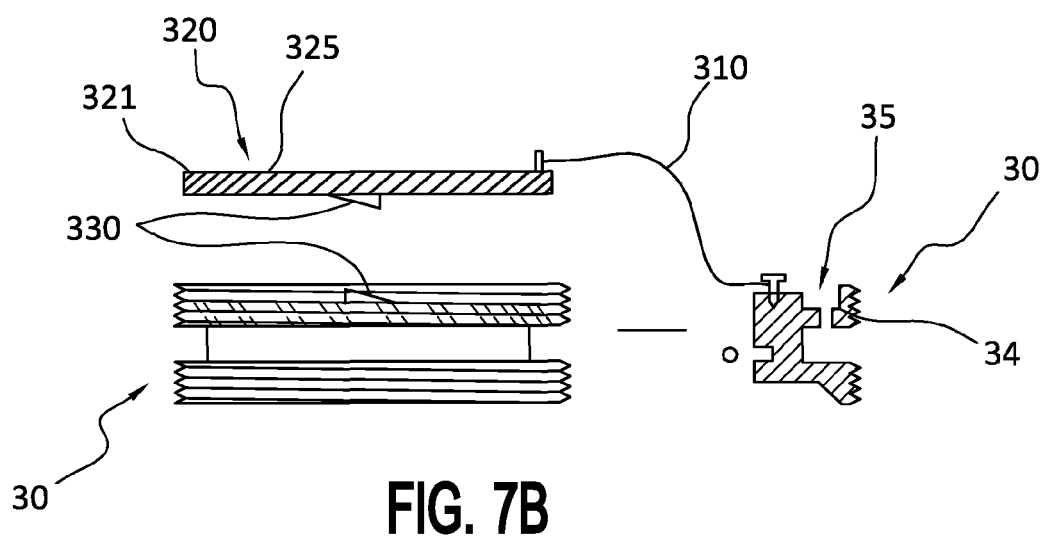

Reference is now made to FIGS. 7A-7B which are principle drawings of a further embodiment of the apparatus 10. In this embodiment the main body 11 is formed by a mainly disc-shaped housing 20 and a mainly disc-shaped body 30, as described for the previous embodiments. The flexible part, flange or lip 13 is in this embodiment formed as a separate component, wherein the housing 20 at upper part is adapted to receive and accommodate the flexible part, flange or lip 13 and held in place by a fixation plate 29, which is detachably arranged to the housing 20 by means of corresponding threads.

The housing 20 is as in the previous embodiments arranged for receiving and accommodating the mechanical cleaning assembly 300. The mechanical cleaning assembly 300 can be formed as in any one of the described embodiments. In the shown embodiment is however an alternative embodiment of the mechanical cleaning assembly 300 of the one in FIGS. 6A-6B shown. As for the embodiment in FIGS. 6A-6B the mainly disc-shaped body 30 is provided with at least one inclined through hole 34 and the rotor 321 is arranged to be accommodated and rotating in the mainly disc-shaped body 30. This embodiment is based on the use of a rotor 321 provided with propeller blades 325 at exterior surface thereof, deviating with an angle in the opposite direction of the at least one inclined through hole 34 of the mainly disc-shaped body 30. The rotor 321 and mainly disc-shaped main body 30 are provided with interior corresponding locking devices 330. By supplying cleaning fluid via the at least one through hole 34 this will result in that the propeller blades 325 rotates the rotor 321 as well as lifting the rotor 321 from the mainly disc-shaped main body 30 upwards limited by the flexible part, flange or lip 13 such that the locking devices 330 goes out of engagement with each other and the rotor 321 is free to rotate, similar to the embodiment of FIGS. 6A-6B. When the cleaning process is finished and the cleaning fluid pressure drops and the flexible part, flange or lip 13 will push the rotor 321 towards the mainly disc-shaped main body 30 and the locking devices 330 will again go into engagement and lock the two parts together. The mechanical cleaning device 310 will similarly to the embodiment of FIG. 6A-6B also in this embodiment be fixed at one end to the main body 30 or the housing 20, and at the other end be arranged to the rotor 321 as described above.

The function and operation of the mechanical cleaning assembly 300 is similar to the one described in FIGS. 6A-6B.

Figure 8A:
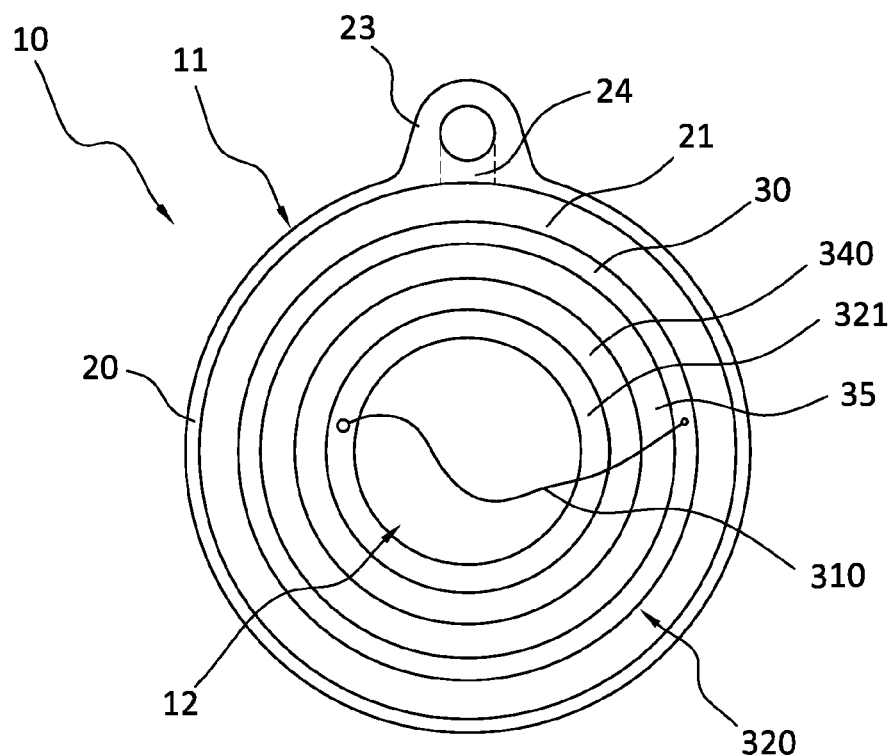
FIGS. 8A-8B are principle drawings of a further alternative embodiment of the apparatus for cleaning object surface.
Figure 8B:
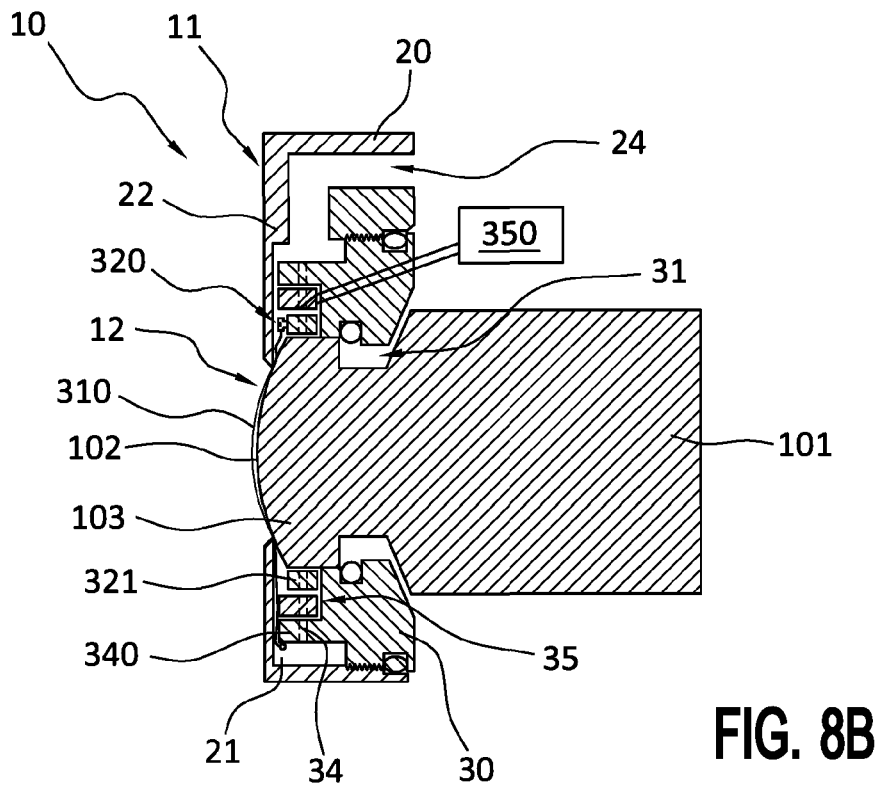

Reference is now made to FIGS. 8A-8B which are principle drawings of an embodiment where the mechanical cleaning device 300 is electrically driven. The driving unit 320 according to this embodiment is formed by a rotor 321 and a stator 340, wherein the stator the stator 340 is arranged fixed in the annular recess 35 of the mainly disc-shaped body 30 and the rotor 321 is arranged to rotate within the stator 340. The stator 340 can alternatively be an integrated part of the mainly disc-shaped body 30 or housing 20. The stator 340 is connected to a power supply source 350 and the rotor 321 will be provided with permanent magnets or windings distributed along the circumference thereof. By applying a current to the stator 340, this will induce a magnetic field in the rotor 321 resulting in that the rotor 321 will rotate. The mechanical cleaning device 310 will be arranged/fixed at one end to the rotor 321, while at the other end is arranged/fixed to the mainly disc-shaped body 30 or housing 20. This embodiment enables cleaning by the mechanical cleaning device 310 both with cleaning fluid and without cleaning fluid. The mechanical cleaning device 310 can thus also be used as a wiper without cleaning fluid. By using an electrically driven solution, one can use a delay to be sure that the object surface is wetted before the mechanical cleaning device 310 is operated. An electrically driven solution can also be used to ensure that the mechanical cleaning device 310 is positioned out of the field of view/function area of the object 100 when cleaning is not performed by that one know the position of the rotor 321, and thus the fixation point of the mechanical cleaning device 310. By appropriate controlling, one can thus position the rotor 321 and thus fixation/arrangement point of the mechanical cleaning device 310 thereon in a position where one is sure that the mechanical cleaning device 310 is positioned out of the field of view/function area of the object 100.

Figure 9A:
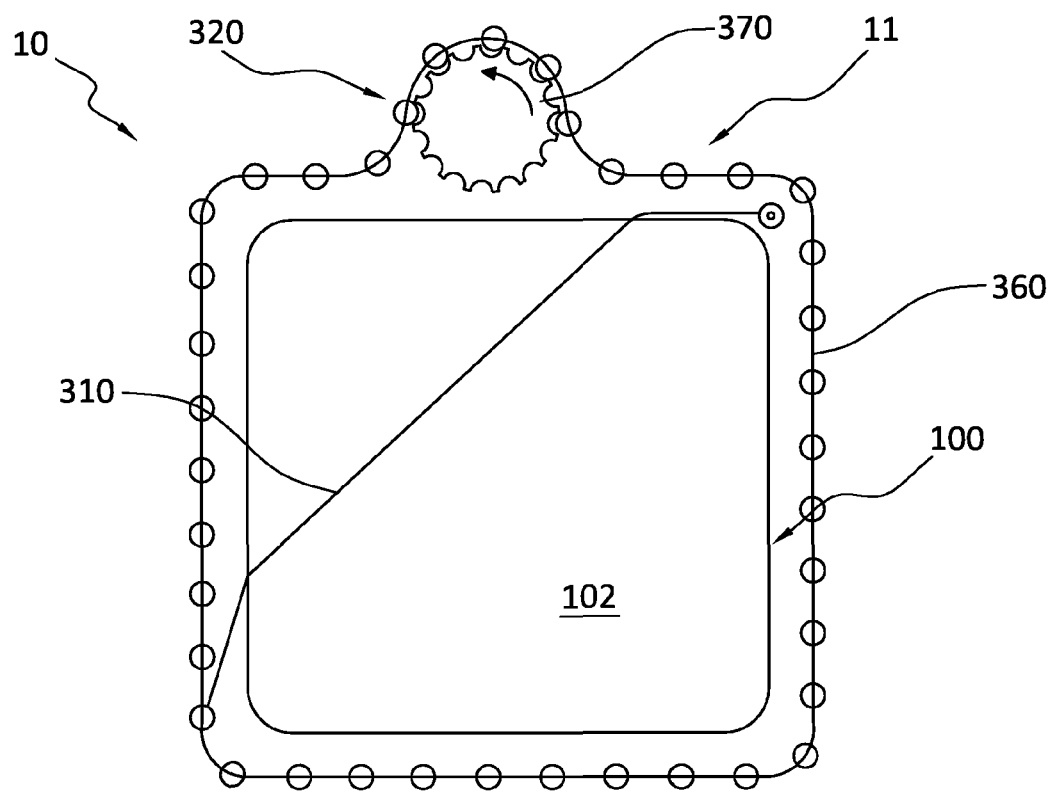
FIGS. 9A-9C are principle drawings of a further embodiment of the apparatus for cleaning objects surface provided with a mechanical cleaning assembly.
Figure 9B:
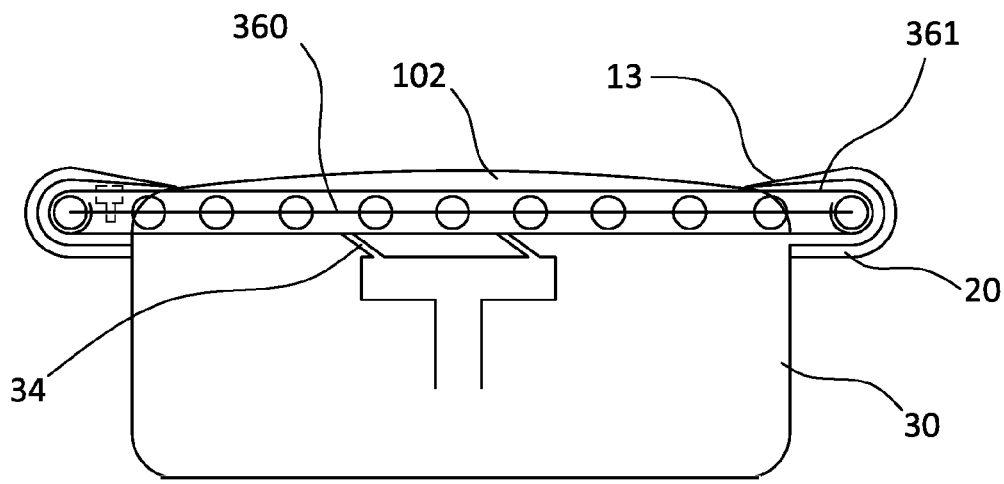

Reference is now made to FIGS. 9A-9B which are principle drawing of an alternative embodiment of the mechanical cleaning assembly 300. In the shown embodiment the object 100 is exemplified by a light of a vehicle or camera. In this embodiment the mechanical cleaning assembly 300 is mechanically driven. In this embodiment, the driving unit 320 for the mechanical cleaning device 310 comprises a chain 360, wire, belt or thread arranged for moving in a track 361 extending mainly along the circumference of the object surface 102, i.e. the chain 360 is arranged to rotate along the circumference of the object surface 102. The driving unit 320 further comprises a cogwheel 370 providing movement of the chain 360, wire, belt or thread, wherein the rotational movement of the cogwheel 370 is provided by an electric motor (not shown). The mechanical cleaning device 310 will in this embodiment be arranged/fixed at one end to a position on the chain 360, wire, belt or thread and at the other end is fixed/arranged to the body 11. In the example is shown the use of a beaded chain 360 arranged to move in a mainly tubular track 361, wherein the tubular track 361 exhibits a slot (not shown) facing the interior side thereof, through which slot the mechanical cleaning device 310 extends such that the mechanical cleaning device 310 is free to move over the object surface 102. The use of a beaded chain 360 moving in a tubular track 361 will provide a solution with low friction. By moving the chain 360, wire, belt or thread by means of the cogwheel 370, one end of the mechanical cleaning device 310 will move as described above and a more or less random or fixed pattern is achieved, wherein the flexible part, flange or lip 13 will keep the mechanical cleaning device 310 tensioned over the object surface 102.

Accordingly, this embodiment enables cleaning by the mechanical cleaning device 310 both with cleaning fluid and without cleaning fluid. The mechanical cleaning device 310 can thus also be used as a wiper without cleaning fluid. It should also be mentioned that this embodiment provides a solution where the chain 360, wire, belt or thread can be moved in both directions by the rotational direction of the cogwheel 370, and thus also move the mechanical cleaning device 310 in opposite directions. It should be noted that wheels, cogwheels or similar can be arranged in corners of the circumference of the object surface 102 to facilitate the movement of the chain 360, wire, belt or thread along the circumference thereof.

Figure 9C:
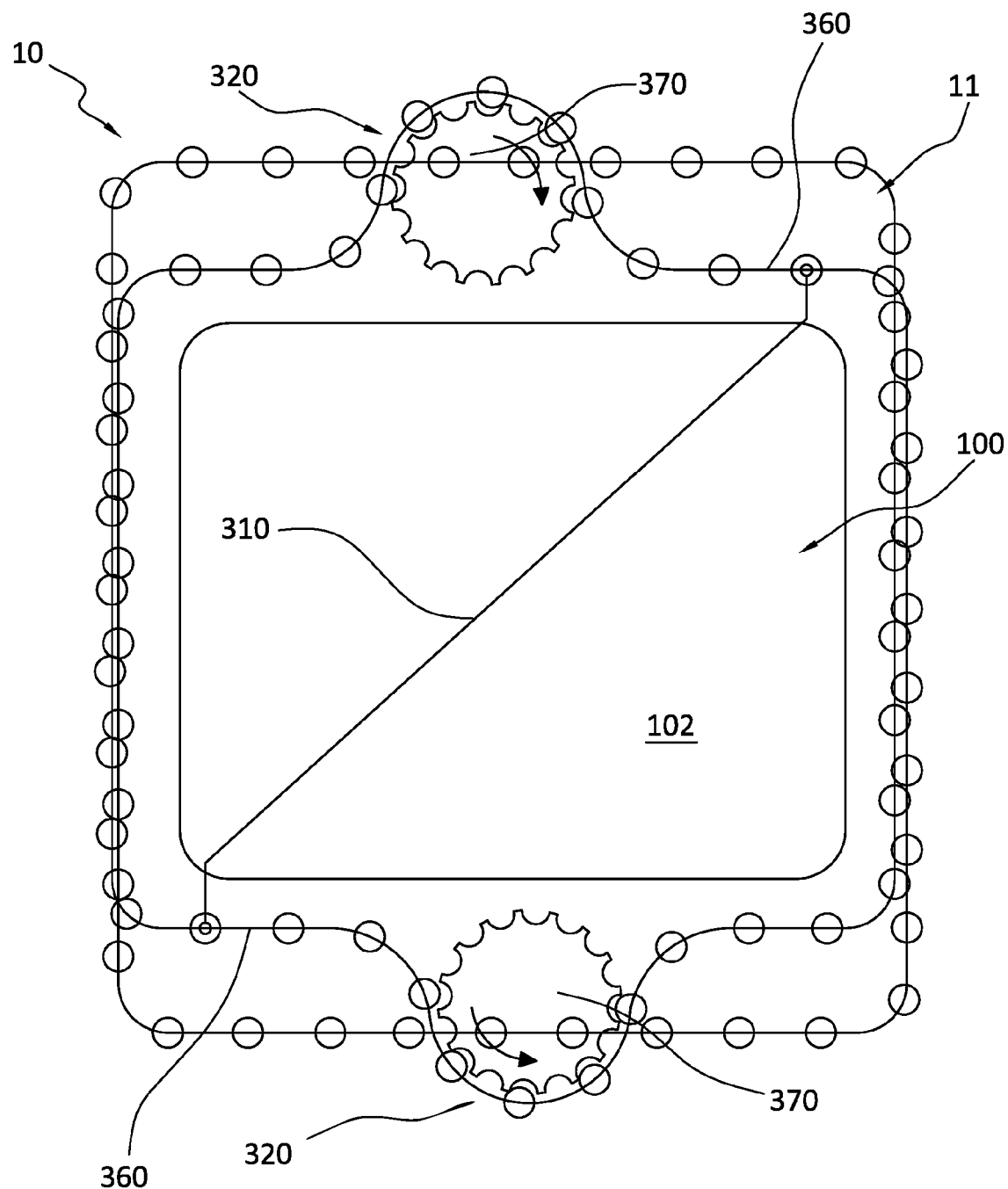

Reference is now made to FIG. 9c which is an alternative embodiment of the embodiment in FIGS. 9A-9B, where both ends of the mechanical cleaning device 310 is arranged to separate chains 360, wires, belts or threads or threads, moving in the same direction or opposite direction. When moved in the same direction it will be preferable that the cogwheels 370 are operated at different rotational velocity. This embodiment will work similarly to the one described in FIGS. 5A-5C.

Figure 10:
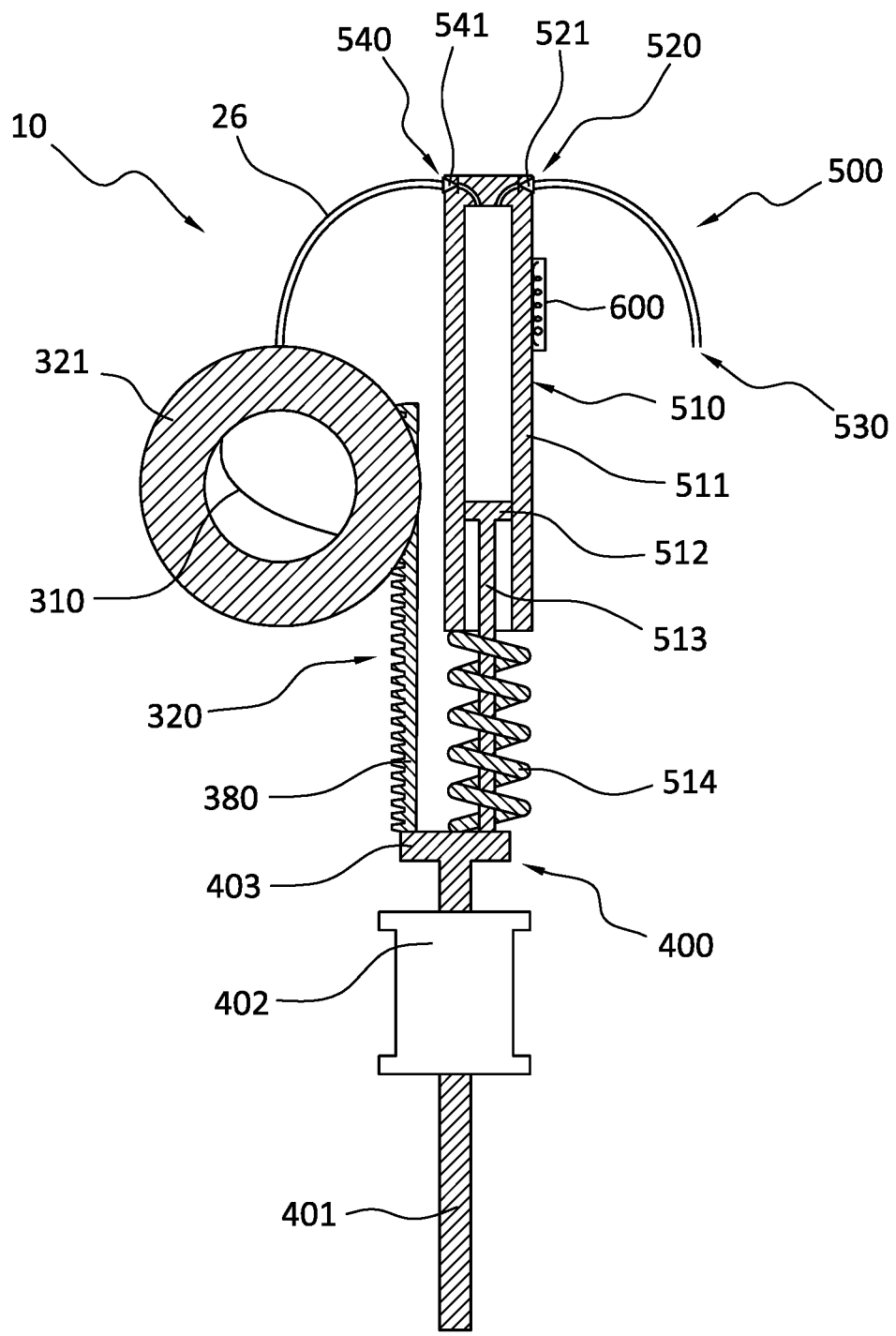
FIG. 10 is a principle drawing of a further embodiment of the apparatus for cleaning objects surface.

Reference is now made to FIG. 10 which is a principle drawing of a further embodiment of the apparatus 10. Parts of the main body 11 are omitted in the shown embodiment for revealing details. In this embodiment the driving unit 320 for the mechanical cleaning device 310 is mechanically driven. In this embodiment the driving unit 320 comprises a pitch rack 380 arranged in rotational engagement with the rotor 321 by means of a transmission device (not shown), such as one or more cogwheels, transferring longitudinal movement of the pitch rack 380 to rotational movement of the rotor 321.

The driving unit 320 is in this embodiment arranged to a driving device 400 providing longitudinal movement of the pitch rack 380.

In the shown embodiment is also an assembly 500 for supplying cleaning fluid to the apparatus shown, which can be operated at the same time as the mechanical cleaning device 310 is operated.

The driving device 400 is formed by a shaft 401 driven by a driving source 402, such as an electric motor or a solenoid, for moving the shaft 401 in a longitudinal direction of the driving source 402. In the example, there is shown the use of a solenoid and wherein the shaft 401 is extending through the solenoid 402 and wherein the shaft 401 at one end 403 is connected to the driving unit 320 of the mechanical cleaning assembly 300 and the assembly 500 for supplying cleaning fluid.

The assembly 500 for supplying cleaning fluid is in the shown embodiment comprising a piston assembly 510 comprising a cylinder 511, wherein a piston 512 operated by a piston rod 513 is arranged. The cylinder 511 is at one side of upper part thereof provided with a fluid inlet 520 connected to a fluid supply 530 via a non-return valve 521. The cylinder 511 is further at the opposite side at the upper part thereof provided with a fluid outlet 540 connected to the fluid supply channel 26 of the housing 20 via a non-return valve 541.

In the shown embodiment, the mentioned pitch rack 380 and piston rod 513 of the piston assembly 500 are both arranged to the end 403 of the shaft 402 for parallel longitudinal movement. There is preferably further arranged a spring 514 to the piston rod 513, between the cylinder 511 and the end 403 of the shaft 402.

Accordingly, the chamber of the cylinder 511 will be filled with cleaning fluid when the piston 512 is in a retracted position. When a cleaning process is activated the longitudinal movement of the shaft 402 will push cleaning fluid out of the fluid outlet 540 supplying cleaning fluid to the apparatus 10 at the same time as the pitch rack 380 is moved in longitudinal direction resulting in rotation of the rotor 321 driving the mechanical cleaning assembly 310 as described above. When the cleaning process is completed the spring 514 will ensure that the piston 512 is retracted and the shaft 402 moved longitudinally in the opposite direction. This opposite movement of the shaft 402 results in that the chamber of the cylinder 511 is again filled with cleaning fluid from the cleaning fluid supply 530, and that the pitch rack 380 is moved in opposite direction, resulting in that the rotor 321 is rotated in the opposite direction moving the mechanical cleaning device 310 in the opposite direction wiping of the object surface 102 like a wiper.

Accordingly, in this embodiment the supply of cleaning fluid and operation of the mechanical cleaning device 310 is achieved in a combined manner by longitudinal movement of the shaft 402.

It should further be mentioned that the above-described solution can be used for driving of the assembly 500 for fluid supply alone or the rotor 321 alone.

The shown embodiment also gives an example of how a heating element 600 can be implemented for heating of the cleaning fluid in winter time. In the shown example, this is achieved by that the heating element 600 is attached to the cylinder 511 for heating of cleaning fluid therein. Another alternative will be that the heating element is enclosing the channel 26.

An obvious modification of the above-described embodiments is that the mentioned at least one rotor 321-322 can be arranged to be rotated directly by an electrical motor or via one or more transmission devices.

All the above-described embodiments can be combined to form modified and new embodiments within the scope of the attached claims.

Accordingly, by the apparatus 10 for cleaning of object surface according to the latter disclosed embodiments is achieved an apparatus 10 for cleaning object surface with a mechanical cleaning assembly 300 which effectively and rapidly can perform cleaning of the object surface 102 within a few seconds, as well as removing film, material or water droplets on the object surface 102 effectively.

By ensuring that, in some of the above-described embodiments, the mechanical cleaning device 310 at all times would be in cleaning fluid, and due to the fact that the apparatus 10 for cleaning object surface is arranged to ensure that cleaning fluid is present at the object surface 102 it is provided low friction and long operating time.

Further, the disclosed embodiments provide a robust apparatus 10 for cleaning object surface which will withstand the forces of a high-pressure washer due to the use of the flexible part, flange or lip 13, and the design of the mechanical cleaning assembly 300 ensures that the mechanical cleaning device 310 will be positioned behind the flexible part, flange or lip 13, protecting it at all time when not used.

The apparatus 10 for cleaning object surface further provides a compact and robust solution.

The disclosed embodiments further provide an apparatus 10 for cleaning object surface which is easy to arrange to and dismount from the relevant object 100 it is to be used on.

The size and shape of the mechanical cleaning device 310 can be adapted to the object surface 102 it is to be used on. It can e.g. be formed as a thread, as a wiper or similar shapes, which will be within the knowledge of a skilled person.

The above-described principles can be used on any kind of object requiring cleaning for improving function or visibility. Examples of objects 100 are typically vehicle-mounted sensors providing information about the surroundings, such as, but not limited to, proximity sensors, sensors for parking assistance, blind zone object detection, traffic lane departure, traffic signal identification, rear view mirror substitution etc., and lidars or other kind of sensor where it is required to clean the surface for dust, ice, snow, rain or dirt of any kind which could reduce the operation of the sensor. The same applies for sensors on seagoing crafts, airplanes, drones or similar.

Other kinds of objectives will be applicable, e.g., but not limited to, cameras on crafts, airplanes, drones or similar, surveillance cameras in public areas, tunnels, etc.

The disclosed embodiments are also applicable for cleaning of windows, cover, signs, boards, signposts or similar, of any kind and shape.

Further, the principles of the disclosed embodiments will be applicable on any kind of object surface, i.e. the object surface can be concave, convex or planar or any other shape. Further, the principles are applicable on any kind of shape of the object, such as, but not limited to, mainly rectangular, mainly quadratic, mainly disc-shaped, mainly cylindrical, or mainly cylinder-shaped.

Even though it in some of the embodiments above is described an apparatus 10 for cleaning object surface acting directly on the object surface, the apparatus 10 for cleaning object surface can be used on cover windows/glass or housings located facing the object.

The apparatus 10 for cleaning object surface can further be arranged to use more than one cleaning fluid, hereunder also (compressed) air.

The apparatus 10 for cleaning object surface can further be arranged to an automatic activation system, which will initiate a cleaning procedure if the visibility of the object is reduced.

The invention claimed is:

1. An apparatus (10) for cleaning object surface (102) adapted for arrangement to or to accommodate an object (100) and configured to supply cleaning fluid to the object surface (102), comprising
a body (11) provided with an opening (12) with a circumferentially extending flexible element selected from the group consisting of a part, flange and lip (13) configured to partly cover the object surface (102) in a circumferential direction thereof and engageable with the object surface (102) with a pretension force, wherein
the apparatus (10) is arranged to supply cleaning fluid interior of the body (11) and the flexible element (13) is arranged to bend away from the object surface (102) when subjected to cleaning fluid supplied interior of the body (11).

2. The apparatus (10) for cleaning object surface according to claim 1, wherein the apparatus (10) is arranged to supply cleaning fluid in contact with the object surface (102) and where the cleaning fluid remains in contact with the object surface (102) until the cleaning fluid is ejected away from the object surface (102).

3. The apparatus (10) for cleaning object surface according to claim 2, wherein the apparatus (10) is arranged for supplying cleaning fluid in a circumferential direction of the object surface (102) and a flow from the circumferential direction and towards a center of the object surface (102) where the cleaning fluid is ejected substantially perpendicularly away from the object surface (102).

4. The apparatus (10) for cleaning object surface according to claim 3, wherein the mechanical cleaning device (310) is arranged at one end to the body (11) and is arranged at another end to a driving unit (320), or is arranged to a driving unit (320) at both ends.

5. The apparatus (10) for cleaning object surface according to claim 4, wherein the mechanical cleaning assembly (300) comprises a locking mechanism (330) to selectively prevent operation of the mechanical cleaning assembly (310).

6. The apparatus (10) for cleaning object surface according to claim 2, wherein the mechanical cleaning device (310) is arranged at one end to the body (11) and is arranged at another end to a driving unit (320), or is arranged to a driving unit (320) at both ends.

7. The apparatus (10) for cleaning object surface according to claim 6, wherein the mechanical cleaning assembly (300) comprises a locking mechanism (330) to selectively prevent operation of the mechanical cleaning assembly (310).

8. The apparatus (10) for cleaning object surface according to claim 1, comprising a seal (33) within the body (11) sealing against the object (100) providing a sealing barrier for cleaning fluid in the apparatus (10).

9. The apparatus (10) for cleaning object surface according to claim 8, wherein the mechanical cleaning device (310) is arranged at one end to the body (11) and is arranged at another end to a driving unit (320), or is arranged to a driving unit (320) at both ends.

10. The apparatus (10) for cleaning object surface according to claim 9, wherein the mechanical cleaning assembly (300) comprises a locking mechanism (330) to selectively prevent operation of the mechanical cleaning assembly (310).

11. The apparatus (10) for cleaning object surface according to claim 1, further comprising a mechanical cleaning assembly (300) comprising a mechanical cleaning device (310) for physical cleaning of the object surface (102).

12. The apparatus (10) for cleaning object surface according to claim 11, wherein the mechanical cleaning device (310) is formed by an elastic element.

13. The apparatus (10) for cleaning object surface according to claim 12, wherein the mechanical cleaning device (310) is arranged at one end to the body (11) and is arranged at another end to a driving unit (320), or is arranged to a driving unit (320) at both ends.

14. The apparatus (10) for cleaning object surface according to claim 11, wherein the mechanical cleaning device (310) is arranged at one end to the body (11) and is arranged at another end to a driving unit (320), or is arranged to a driving unit (320) at both ends.

15. The apparatus (10) for cleaning object surface to claim 14, wherein the mechanically cleaning assembly (300) is driven by one or more of cleaning fluid, mechanically or electrically.

16. The apparatus (10) for cleaning object surface according to claim 14, wherein the drive unit (320) comprises one or more from the group consisting of rotor (321), chain (360), wire, belt and thread.

17. The apparatus (10) for cleaning object surface according to claim 14, wherein the mechanical cleaning assembly (300) comprises a locking mechanism (330) to selectively prevent operation of the mechanical cleaning assembly (310).

18. The apparatus (10) for cleaning object surface according to claim 11, wherein the mechanically cleaning assembly (300) is driven by one or more of cleaning fluid, mechanically or electrically.

19. The apparatus (10) for cleaning object surface according to claim 11, wherein the mechanical cleaning assembly (300) comprises a locking mechanism (330) to selectively prevent operation of the mechanical cleaning assembly (310).

* * * * *